(12) United States Patent
Tang et al.

(10) Patent No.: US 8,265,062 B2
(45) Date of Patent: Sep. 11, 2012

(54) SYSTEM AND METHOD FOR ACCOMPLISHING SPECIAL CALL TREATMENT IN A VOICE OVER INTERNET PROTOCOL TELEPHONE SYSTEM

(75) Inventors: Hwan-Jang Tang, Lexington, MA (US); Vitaliy G. Yurchenko, Newton, MA (US)

(73) Assignee: Ibasis, Inc., Burlington, MA (US)

( * ) Notice: Subject to any disclaimer, the term of this patent is extended or adjusted under 35 U.S.C. 154(b) by 2007 days.

(21) Appl. No.: 11/297,436

(22) Filed: Dec. 9, 2005

(65) Prior Publication Data

US 2006/0092926 A1 May 4, 2006

Related U.S. Application Data

(63) Continuation-in-part of application No. 10/646,687, filed on Aug. 25, 2003, now Pat. No. 7,577,131, which is a continuation-in-part of application No. 10/298,208, filed on Nov. 18, 2002, now Pat. No. 7,529,225, and a continuation-in-part of application No. 10/094,671, filed on Mar. 7, 2002, now Pat. No. 7,391,731.

(60) Provisional application No. 60/331,479, filed on Nov. 16, 2001.

(51) Int. Cl.
 *H04L 12/66* (2006.01)
(52) U.S. Cl. ........................................ 370/352; 370/401
(58) Field of Classification Search .................. 370/352, 370/401
See application file for complete search history.

(56) References Cited

U.S. PATENT DOCUMENTS

| | | | |
|---|---|---|---|
| 6,292,481 B1 | 9/2001 | Voit et al. | |
| 6,449,260 B1 * | 9/2002 | Sassin et al. | 370/270 |
| 6,687,245 B2 | 2/2004 | Fangman et al. | |
| 6,711,241 B1 | 3/2004 | White et al. | |
| 6,798,745 B1 * | 9/2004 | Feinberg | 370/235 |
| 6,842,427 B1 | 1/2005 | Evslin et al. | |
| 6,904,017 B1 | 6/2005 | Meempat et al. | |
| 6,914,898 B2 | 7/2005 | Sasagawa et al. | |
| 7,068,646 B2 | 6/2006 | Fangman et al. | |
| 7,068,647 B2 | 6/2006 | Fangman et al. | |
| 7,088,723 B2 | 8/2006 | Yang | |
| 2001/0036172 A1 | 11/2001 | Haskal | |
| 2001/0050911 A1 * | 12/2001 | Eastman | 370/352 |
| 2002/0041588 A1 | 4/2002 | Gleneck | |
| 2002/0150227 A1 * | 10/2002 | Abraham | 379/218.02 |
| 2003/0012178 A1 * | 1/2003 | Mussman et al. | 370/352 |
| 2003/0091024 A1 * | 5/2003 | Stumer | 370/352 |
| 2004/0174880 A1 | 9/2004 | White et al. | |
| 2005/0063364 A1 | 3/2005 | Sun et al. | |

* cited by examiner

*Primary Examiner* — Asad Nawaz
*Assistant Examiner* — Najeebuddin Ansari
(74) *Attorney, Agent, or Firm* — Nixon & Vanderhye P.C.

(57) ABSTRACT

A system and method for treating a VoIP call in a special fashion when the call is to be routed from an originating gateway to a destination gateway over the Internet. The system and method make use of a special decline destination gateway which may be configured to return a special cost code to the originating gateway when the originating gateway attempts to establish a telephone call with the decline destination gateway. A routing controller of the system would provide the originating gateway with a list of potential destination gateways, and the decline destination gateway would always be the last entry on the list. This would cause the originating gateway to first attempt to place the call through the other potential destination gateways. However, if none of the other destination gateways can be used, the originating gateway will ultimately attempt to place the call through the decline destination gateway. When the originating gateway receives back the special cost code from the decline destination gateway, the originating gateway would know to treat the call in a special fashion. In some embodiments, the decline destination gateway itself might treat the call in the special fashion.

53 Claims, 15 Drawing Sheets

GATEWAYS

|   | A | B | C | D | E | F | G | H | I | J |
|---|---|---|---|---|---|---|---|---|---|---|
| A | X | 1.3 | 2 | 1.8 | 1 | 2 | 2.2 | 3 | 1.7 | 8 |
| B | 0.9 | X | 3 | 1 | 1.6 | 7 | 1 | X | 1.3 | 2 |
| C | X | 2 | X | 2 | X | 1.7 | 1.8 | 6 | 5 | 5 |
| D | X | X | X | X | X | X | 1.2 | 1.3 | 2 | 2 |
| E | 1.6 | 1.8 | 2 | 3 | X | 7 | 1 | 2.2 | 3 | 1 |
| F | X | 2 | 3 | 1 | 1.1 | X | 1.1 | X | X | X |
| G | 2.2 | 2.2 | 2.8 | 2.1 | 3 | X | X | X | X | X |
| H | 1.4 | 1.3 | 1.1 | 1.4 | 1.2 | 3 | 1 | X | 8 | 8 |
| I | 3.2 | 3.4 | 3.1 | 4 | 4.1 | 4.8 | 3 | 1.2 | X | 3 |
| J | 2.1 | 2.2 | 7 | X | X | X | 3.1 | 8 | 9 | X |

Row labels (left axis): GATEWAYS

FIG. 9

SYSTEM AND METHOD FOR ACCOMPLISHING SPECIAL CALL TREATMENT IN A VOICE OVER INTERNET PROTOCOL TELEPHONE SYSTEM

This application is a continuation-in-part of U.S. application Ser. No. 10/646,687 filed Aug. 25, 2003 now U.S. Pat. No. 7,577,131 which is a continuation-in-part of U.S. application Ser. No. 10/298,208, filed Nov. 18, 2002 now U.S. Pat. No. 7,529,225, the disclosure of both of which are hereby incorporated by reference. The application also claims priority to U.S. Provisional Patent Application Ser. No. 60/331,479, filed Nov. 16, 2001, and U.S. application Ser. No. 10/094,671, filed Mar. 7, 2002 now U.S. Pat. No. 7,391,731, the disclosure of both of which are hereby incorporated by reference.

BACKGROUND OF THE INVENTION

1. Field of the Invention

The invention relates generally to the field of communications, and more specifically to a network configured for Voice over Internet Protocol (VoIP) and/or Facsimile over Internet Protocol (FoIP).

2. Background of the Related Art

Historically, most wired voice communications were carried over the Public Switched Telephone Network (PSTN), which relies on switches to establish a dedicated circuit between a source and a destination to carry an analog or digital voice signal. In the case of a digital voice signal, the digital data is essentially a constant stream of digital data. More recently, Voice over Internet Protocol (VoIP) was developed as a means for enabling speech communication using digital, packet-based, Internet Protocol (IP) networks such as the Internet. A principle advantage of IP is its efficient bandwidth utilization. VoIP may also be advantageous where it is beneficial to carry related voice and data communications over the same channel, to bypass tolls associated with the PSTN, to interface communications originating with Plain Old Telephone Service (POTS) with applications on the Internet, or for other reasons. As discussed in this specification, the problems and solutions related to VoIP may also apply to Facsimile over Internet Protocol (FoIP).

Throughout the description that follows there are references to analog calls over the PSTN. This phrase could refer to analog or digital data streams that carry telephone calls through the PSTN. This is distinguished from VoIP or FoIP format calls, which are formatted as digital data packets.

FIG. 1 is a schematic diagram of a representative architecture in the related art for VoIP communications between originating telephone 100 and destination telephone 145. In alternative embodiments, there may be multiple instances of each feature or component shown in FIG. 1. For example, there may be multiple gateways 125 controlled by a single controller 120. There may also be multiple controllers 120 and multiple PSTN's 115. Hardware and software components for the features shown in FIG. 1 are well-known. For example, controllers 120 and 160 may be Cisco SC2200 nodes, and gateways 125 and 135 may be Cisco AS5300 voice gateways.

To initiate a VoIP session, a user lifts a handset from the hook of originating telephone 100. A dial tone is returned to the originating telephone 100 via Private Branch Exchange (PBX) 110. The user dials a telephone number, which causes the PSTN 115 to switch the call to the originating gateway 125, and additionally communicates a destination for the call to the originating gateway 125. The gateway will determine which destination gateway a call should be sent to using a look-up table resident within the gateway 125, or it may consult the controller 120 for this information.

The gateway then attempts to establish a call with the destination telephone 145 via the VoIP network 130, the destination gateway 135, signaling lines 155 and the PSTN 140. If the destination gateway and PSTN are capable of completing the call, the destination telephone 145 will ring. When a user at the destination telephone 145 lifts a handset and says "hello?" a first analog voice signal is transferred through the PSTN 140 to the destination gateway 135 via lines 155. The destination gateway 135 converts the first analog voice signal originating at the destination telephone 145 into packetized digital data (not shown) and appends a destination header to each data packet. The digital data packets may take different routes through the VoIP network 130 before arriving at the originating gateway 125. The originating gateway 125 assembles the packets in the correct order, converts the digital data to a second analog voice signal (which should be a "hello?" substantially similar to the first analog signal), and forwards the second analog voice signal to the originating telephone 100 via lines 155, PSTN 115 and PBX 110. A user at the originating telephone 100 can speak to a user at the destination telephone 145 in a similar manner. The call is terminated when the handset of either the originating telephone 100 or destination telephone 145 is placed on the hook of the respective telephone. In the operational example described above, the telephone 105 is not used.

In the related art, the controllers 120 and 160 may provide signaling control in the PSTN and a limited means of controlling a gateway at one end of the call. It will be appreciated by those skilled in the art that, in some configurations, all or part of the function of the controllers 120 and 160 as described above may be embedded into the gateways 125 and 135, respectively.

SUMMARY OF THE INVENTION

An object of the invention is to provide improved acceptance/decline logic for determining whether to route calls upon receipt of a routing request.

Another object of the invention is to provide an improved ability to cause an originating gateway to decline a call when profitable routes for completing the call are unavailable.

Another object of the invention is to provide an easy way to re-direct calls when the call cannot be completed as dialed.

Another object of the invention is to provide an easy and fast way to treat certain calls in a special manner using existing voice over IP network architecture.

Another object of the invention is to provide an easy way to play a variety of messages to a caller when the call cannot be completed as dialed.

When a VoIP system tries to set up a new telephone call, the originating gateway signals a first potential destination gateway and cost information is exchanged between the two gateways. This allows the originating gateway to determine if the call can be completed for a profit through the first potential destination gateway. If not, the originating gateway will usually try to set the call up through an alternate destination gateway. If all potential destination gateways have been attempted, the originating gateway will decline the call.

Because a new telephone call must be set up very rapidly, while the caller is waiting on the line, the software run by the originating gateway is optimized to send the setup requests to multiple destination gateways, in a serial fashion, until the call is completed to the called party. However, the signaling that must occur when the originating gateway is deciding to decline a call, because no profitable destination gateways are available, is more time consuming, and it requires more bandwidth than simply trying to setup a call.

In a system embodying the invention, a "decline" destination gateway is created and it is connected to the network. The routing controller is configured so that whenever an originating gateway asks for a list of potential destination gateways for routing a call, the routing controller provides the address of the decline destination gateway as the last potential destination gateway on the list. The "decline" destination gateway is configured to return a special cost code whenever an originating gateway sends a call setup request to the decline destination gateway. The software in the originating gateway is configured to recognize this special cost code as a signal to decline the call.

In a system embodying the invention, when an originating gateway is trying to setup a new telephone call, the originating gateway will first try all the real potential destination gateways to try to complete the call. In some instances, it will be impossible to complete the call to the called party. This could occur because of a signal failure, because of an equipment outage, because the call cannot be completed for a sufficiently high profit, or for a variety of other reasons. In this instance, having tried all the real destination gateways, the originating gateway will send a call setup request to the decline destination gateway. The originating gateway will receive back the special cost code, which indicates that the call should be declined. Thus, the system is able to make the determination to decline the call faster and with less overhead signaling than in the prior art systems, where special signaling was required.

In other embodiments of the invention, the decline destination gateway could be used to accomplish other purposes. For instance, when the decline destination gateway receives the call setup request from the originating gateway, the decline destination gateway could pick up the call and play a message to the calling party.

In still other embodiments of the invention, there might be multiple different types of decline destination gateways connected to the network. Each different decline destination gateway could be configured to treat the call in a different fashion. For instance, a first decline destination gateway could be configured to send back a special cost code that would instruct the originating gateway to immediately decline the call. A second decline destination gateway could be configured to send back a special cost code to the originating gateway that would instruct the originating gateway to re-route the call to an alternate number, such as a customer service line. A third decline destination gateway could be configured to pick up the call and play a first message to the calling party. A fourth decline destination gateway could be configured to pick up the call and play a second message to the calling party. When a system is configured in this fashion, the routing engine would have control over which decline destination gateway gets the call, and thus how the call is treated if it cannot be completed.

In fact, the routing controller might provide only a decline destination gateway to the originating gateway when a new call request comes in. This would ensure that the call is immediately routed to the decline destination gateway, which would result in the call immediately being treated in a certain fashion. This could occur, for instance, when the calling party provides an invalid telephone number. In that instance, the call could immediately be routed to a decline destination gateway that would play a message to the calling party indicating that he/she has dialed an invalid number.

In additional embodiments of the invention, the routing engine might also instruct the originating gateway to encode special treatment information into the data in the setup request. This encoded information could also be used by the decline destination or by the originating gateway itself, to determine how to treat the call. Different encoded information could give rise to different call results. For instance, when the decline destination gateway receives a call setup request, it could be configured to look at the encoded information to determine how the call should be treated. If the call is to be immediately declined, it could return a first type of cost code to the originating gateway. If the call is to be re-routed to a customer service line, the decline destination gateway could send back a second special cost code to instruct the originating gateway to send the call to the customer service line. Likewise the encoded information could cause the decline destination gateway itself to take special action.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 9 is a diagram of a matrix illustrating a method for organizing quality of service data for communications paths between gateways;

DETAILED DESCRIPTION OF PREFERRED EMBODIMENTS

Figure 1:
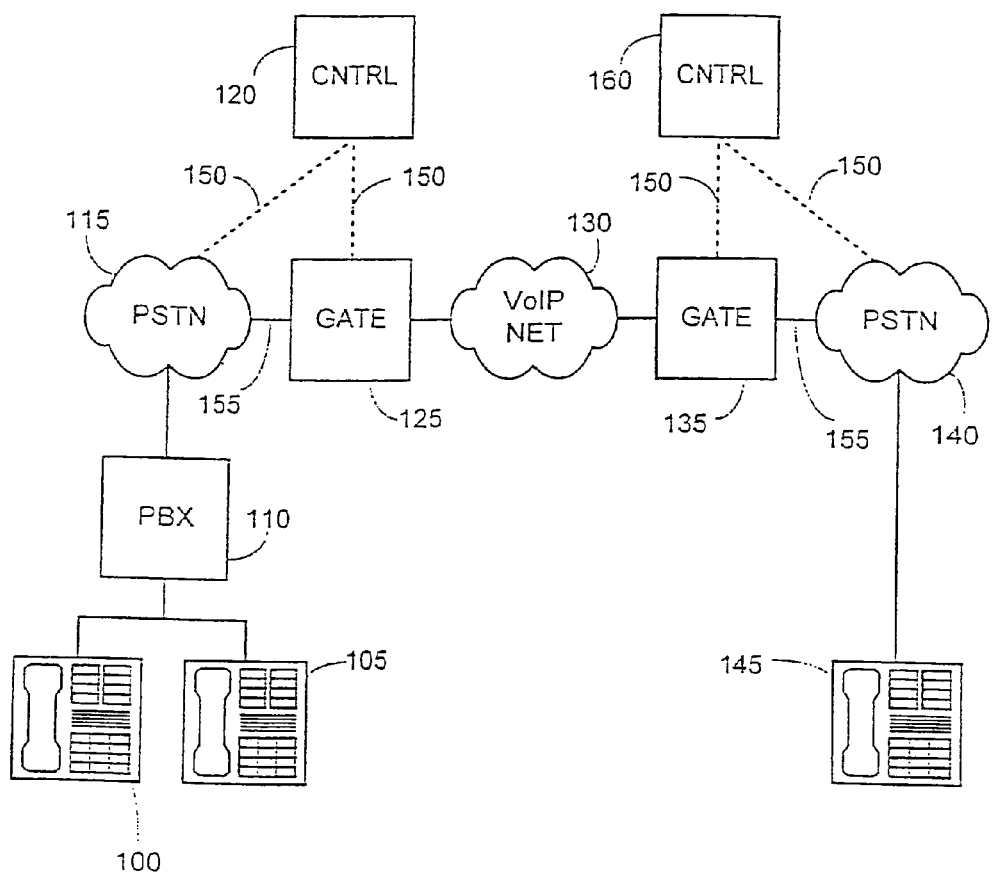
FIG. 1 is a schematic diagram of a system architecture providing VoIP communications, according to the background.
Figure 2:
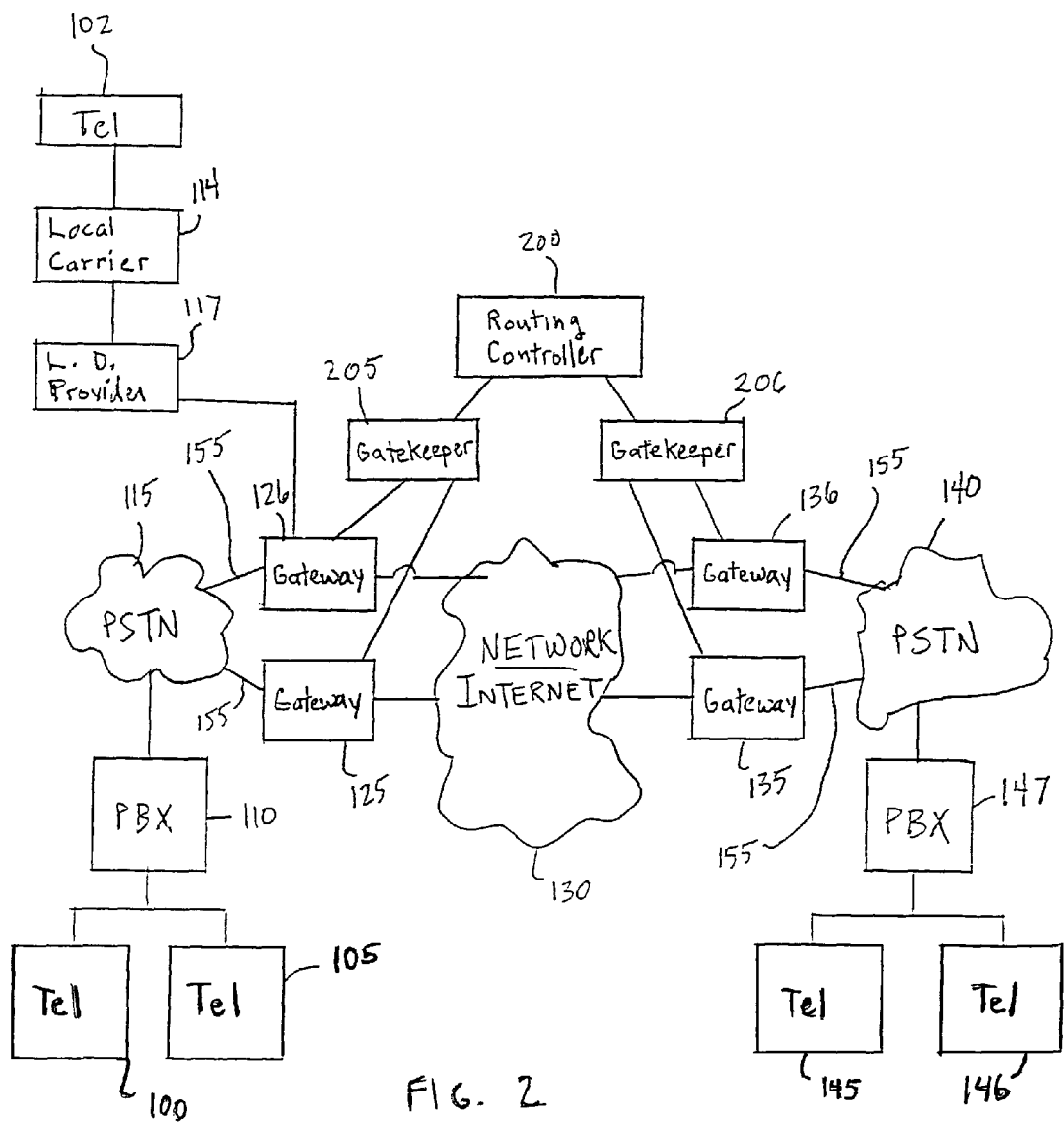
FIG. 2 is a schematic diagram of a system architecture providing VoIP/FoIP communications, according to a preferred embodiment of the invention.

A system embodying the invention is depicted in FIG. 2. The system includes telephones 100/105 connected to a private branch exchange (PBX) 110. The PBX, in turn, is connected to the PSTN 115. In addition, telephones 102 may be coupled to a local carrier 114, which in turn routes long distance calls to one or more long distance service providers 117. Those skilled in the art will recognize that calls could also originate from cellular telephones, computer based telephones, and/or other sources, and that those calls could also be routed through various carriers and service providers. Regardless of where the calls are originating from, they are ultimately forwarded to an originating gateway 125/126.

The originating gateways 125/126 function to convert an analog call into digital packets, which are then sent via the Internet 130 to a destination gateway 135/136. In some instances, the gateways may receive a call that has already been converted into a digital data packet format. In this case, the gateways will function to communicate the received data packets to the proper destination gateways. However, the gateways may modify the received data packets to include certain routing and other formatting information before sending the packets on to the destination gateways.

The gateways 125/126/135/136 are coupled to one or more gatekeepers 205/206. The gatekeepers 205/206 are coupled to a routing controller 200. Routing information used to inform the gateways about where packets should be sent originates at the routing controller.

One of skill in the art will appreciate that although a single routing controller 200 is depicted in FIG. 2, a system embodying the invention could include multiple routing controllers 200. In addition, one routing controller may be actively used by gatekeepers and gateways to provide routing information, while another redundant routing controller may be kept active, but unused, so that the redundant routing controller can step in should the primary routing controller experience a failure. As will also be appreciated by those skilled in the art, it may be advantageous for the primary and redundant routing controllers to be located at different physical locations so that local conditions affecting the primary controller are not likely to also result in failure of the redundant routing controller.

In a preferred embodiment of the invention, as depicted in FIG. 2, the digital computer network 130 used to communicate digital data packets between gateways may be compliant with the H.323 recommendation from the International Telecommunications Union (ITU). Use of H.323 may be advantageous for reasons of interoperability between sending and receiving points, because compliance with H.323 is not necessarily tied to any particular network, platform, or application, because H.323 allows for management of bandwidth, and for other reasons. Thus, in a preferred embodiment, one function of the originating gateways 125 and 126 and the terminating gateways 135 and 136 may be to provide a translation of data between the PSTN=s 115/135 and the H.323-based VoIP network 130. Moreover, because H.323 is a framework document, the ITU H.225 protocol may be used for communication and signaling between the gateways 125/126 and 135/136, and the IETF RTP protocol may be used for audio data between the gateways 125/126 and 135/136, and RAS Registration, Admission, and Status) protocol may be used in communications with the gatekeepers 205/206.

According to the invention, the gatekeeper 205 may perform admission control, address translation, call signaling, call management, or other functions to enable the communication of voice and facsimile traffic over the PSTN networks 115/140 and the VoIP network 130. The ability to provide signaling for networks using Signaling System No. 7 (SS7) and other signaling types may be advantageous over network schemes that rely on gateways with significantly less capability. For example, related art gateways not linked to the gatekeepers of the present invention may only provide signaling for Multi-Frequency (MF), Integrated Services Digital Network (ISDN), or Dual Tone Multi-Frequency (DTMF).

According to a preferred embodiment of the present invention, the gatekeeper 205 may further provide an interface between different gateways, and the routing controller 200. The gatekeeper 205 may transmit routing requests to the routing controller 200, receive an optimized route from the routing controller 200, and execute the route accordingly.

Persons skilled in the art of communications will recognize that gatekeepers may also communicate with other gatekeepers to manage calls outside of the originating gatekeeper=s area of control. Additionally, it may be advantageous to have multiple gatekeepers linking a particular gateway with a particular routing controller so that the gatekeepers may be used as alternates, allowing calls to continue to be placed to all available gateways in the event of failure of a single gatekeeper. Moreover, although the gatekeeping function may be logically separated from the gateway function, embodiments where the gatekeeping and gateway functions are combined onto a common physical host are also within the scope of the invention.

In a system embodying the present invention, as shown in FIG. 2, a routing controller 200 is logically coupled to gateways 125/126 and 135/136 through gatekeepers 205/206. The routing controller 200 contains features not included in the prior art signaling controllers 120 and 160 of the prior art systems described above, as will be described below. Routing controller 200 and gatekeepers 205/206 may be hosted on one or more network-based servers which may be or include, for instance, a workstation running the Microsoft Windows™ NT™, Windows™ 2000, Unix, Linux, Xenix, IBM AIX™, Hewlett-Packard UK™, Novell Netware™, Sun Microsystems Solaris™, OS/2™, BeOS™, Mach, Apache, OpenStep™, Java Virtual Machine or other operating system or platform. Detailed descriptions of the functional portions of a typical routing controller embodying the invention is provided below.

Figure 3:
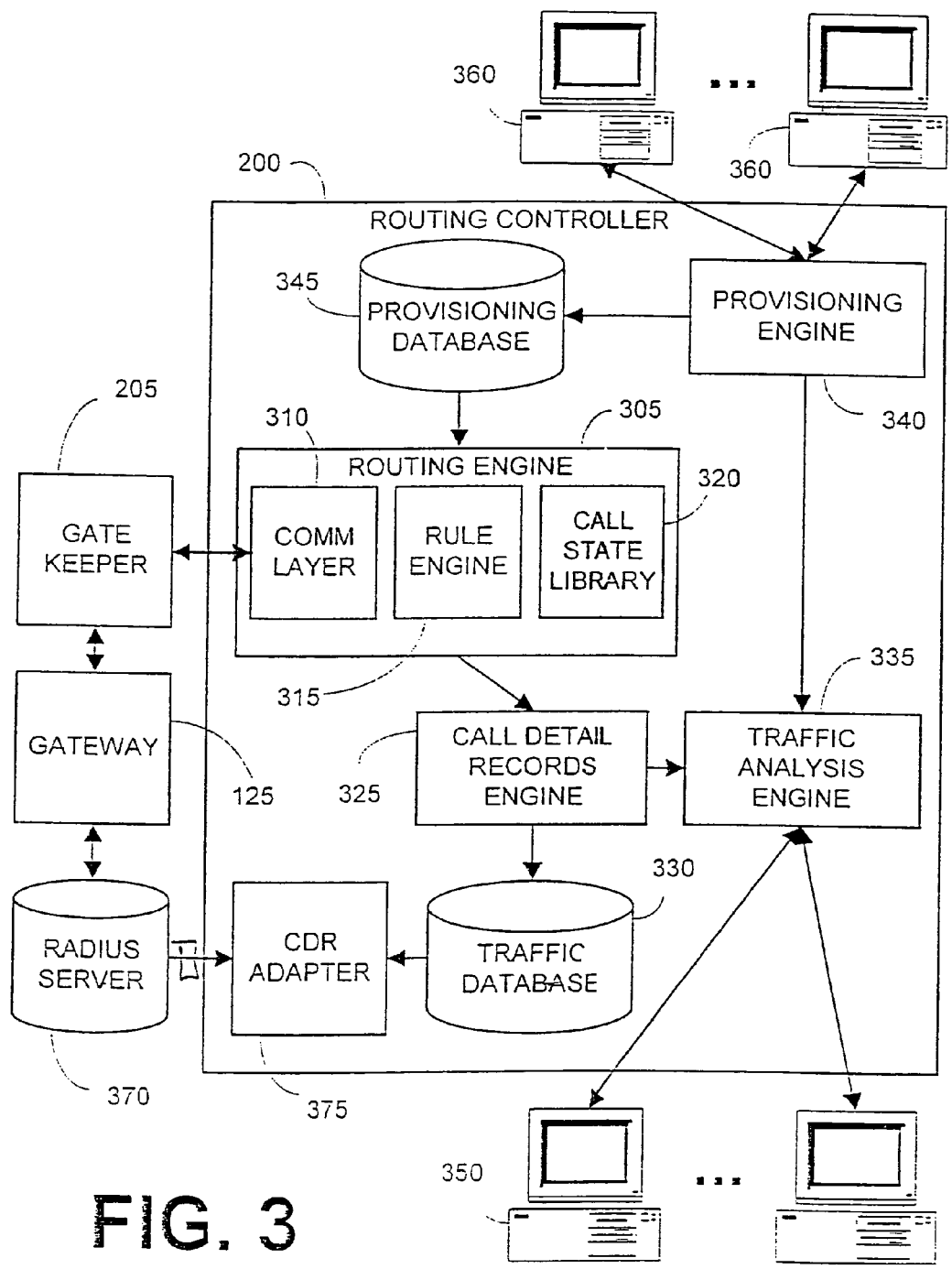
FIG. 3 is a schematic diagram of a system architecture providing improved control for VoIP communications, according to a preferred embodiment of the invention.

As indicated in FIG. 3, a routing controller 200 may include a routing engine 305, a Call Detail Record (CDR) engine 325, a traffic database 330, a traffic analysis engine 335, a provisioning engine 340, and a provisioning database 345. The routing engine 305, CDR engine 325, traffic analysis engine 335, and provisioning engine 340 may exist as independent processes and may communicate to each other through standard interprocess communication mechanisms. They might also exist on independent hosts and communicate via standard network communications mechanisms.

In alternative embodiments, the routing engine 305, Call Detail Record (CDR) engine 325, traffic database 330, traffic analysis engine 335, provisioning engine 340, or provisioning database 345 may be duplicated to provide redundancy. For instance, two CDR engines 325 may function in a master-slave relationship to manage the generation of billing data.

The routing engine 305 may include a communications layer 310 to facilitate an interface between the routing engine 305 and the gatekeepers 205/206. Upon receipt of a routing request from a gatekeeper, the routing engine 305 may determine the best routes for VoIP traffic based upon one or more predetermined attributes such as the selected carrier service provider, time of day, a desired Quality of Service (QoS), cost, or other factors. The routing information generated by the routing engine 305 could include a destination gateway address, and/or a preferred Internet Service Provider to use to place the call traffic into the Internet. Moreover, in determining the best route, the rule engine 315 may apply one or more exclusionary rules to candidate routes, based upon known bad routes, provisioning data from provisioning database 345, or other data.

The routing engine 305 may receive more than one request to route a single call. For example, when a first routing attempt was declined by the terminating gateway, or otherwise failed to result in a connection, or where a previous routing attempt resulted in a disconnect other than a hang-up by the originator or recipient, then the routing engine may receive a second request to route the same call. To provide redundancy, the routing engine 305 may generate alternative routes to a particular far-end destination. In a preferred embodiment of the invention, when the routing engine receives a routing request, the routing engine will return both preferred routing information, and alternative routing information. In this instance, information for at least one next-best route will be immediately available in the event of failure of the preferred route. In an alternative embodiment, routing engine 305 may determine a next-best route only after the preferred route has failed. An advantage of the latter approach is that routing engine 305 may be able to better determine the next-best route with the benefit of information concerning the most recent failure of the preferred route.

To facilitate alternative routing, and for other reasons, the routing engine 305 may maintain the state of each VoIP call in a call state library 320. For example, routing engine 305 may store the state of a call as "set up," "connected," "disconnected," or some other state.

Routing engine 305 may further format information about a VoIP call such as the originator, recipient, date, time, duration, incoming trunk group, outgoing trunk group, call states, or other information, into a Call Detail Record (CDR). Including the incoming and outgoing trunk group information in a CDR may be advantageous for billing purposes over merely including IP addresses, since IP addresses may change or be hidden, making it difficult to identify owners of far-end network resources. Routing engine 305 may store CDR's in a call state library 320, and may send CDR's to the CDR engine 325 in real time, at the termination of a call, or at other times.

The CDR engine 325 may store CDR's to a traffic database 330. To facilitate storage, the CDR engine 325 may format CDR's as flat files, although other formats may also be used. The CDR's stored in the traffic database 330 may be used to generate bills for network services. The CDR engine 325 may also send CDR's to the traffic analysis engine 335.

Data necessary for the billing of network services may also be stored in a Remote Authentication Dial-In User Service (RADIUS) server 370. In fact, in some embodiments, the data stored in the RADIUS server may be the primary source of billing information. The RADIUS server 370 may also directly communicate with a gateway 125 to receive and store data such as incoming trunk group, call duration, and IP addresses of near-end and far-end destinations. The CDR adapter 375 may read data from both the traffic database 330 and the RADIUS server 370 to create a final CDR. The merged data supports customer billing, advantageously including information which may not be available from RADIUS server 370 alone, or the traffic database 330 alone.

The traffic analysis engine 335 may collect CDR's, and may automatically perform traffic analysis in real time, near real time, or after a predetermined delay. In addition, traffic analysis engine 335 may be used to perform post-traffic analysis upon user inquiry. Automatic or user-prompted analysis may be performed with reference to a predetermined time period, a specified outgoing trunk group, calls that exceed a specified duration, or according to any other variable(s) included in the CDR's.

The provisioning engine 340 may perform tasks necessary to route particular calls over the Internet. For example, the provisioning engine 340 may establish or modify client account information, authorize a long distance call, verify credit, assign phone numbers where the destination resides on a PSTN network, identify available carrier trunk groups, generate routing tables, or perform other tasks. In one embodiment of the invention, provisioning may be performed automatically. In another embodiment, provisioning may be performed with user input. Hybrid provisioning, that is, a combination of automated and manual provisioning, may also be performed. The provisioning engine 340 may further cause provisioning data to be stored in a provisioning database 345.

Client workstations 350 and 360 may be coupled to routing controller 200 to provide a user interface. As depicted in FIG. 3, the client(s) 350 may interface to the traffic analysis engine 335 to allow a user to monitor network traffic. The client(s) 360 may interface to the provisioning engine 340 to allow a user to view or edit provisioning parameters. In alternative embodiments, a client may be adapted to interface to both the traffic analysis engine 335 and provisioning engine 340, or to interface with other features of routing controller 200.

In a system embodying the invention, as shown in FIG. 2, the gateways 125/126 would first receive a request to set up a telephone call from the PSTN, or from a Long Distance Provider 117, or from some other source. The request for setting up the telephone call would typically include the destination telephone number. In order to determine which destination gateway should receive the packets, the gateway would consult the gatekeeper 205.

The gatekeeper 205, in turn may consult the routing controller 200 to determine the most appropriate destination gateway. In some situations, the gatekeeper may already have the relevant routing information. In any event, the gatekeeper would forward the routing information to the originating gateway 125/126, and the originating gateway would then send the appropriate packets to the appropriate destination gateway. As mentioned previously, the routing information provided by the gatekeeper may include just a preferred destination gateway, or it may include both the preferred destination gateway information, and information on one or more next-best destination gateways. The routing information may also include a preferred route or path onto the Internet, and one or more next-best route. The routing information may further include information about a preferred Internet Service Provider.

Figure 4:
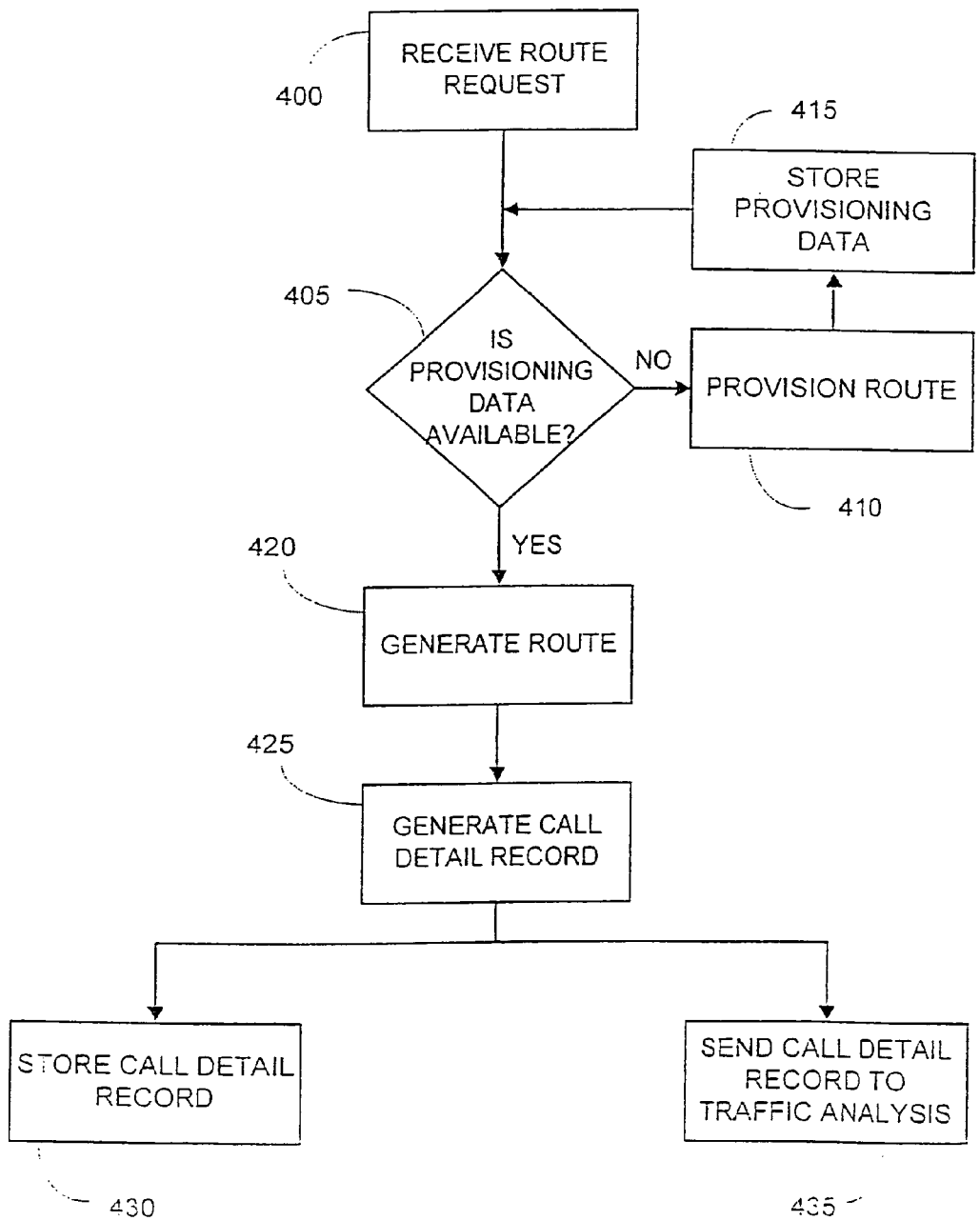
FIG. 4 is a flow diagram illustrating a method for routing control, according to a preferred embodiment of the invention.

FIG. 4 is a flow chart illustrating a method embodying the invention for using the routing controller 200. In step 400, the routing controller 200 receives a routing request from either a gatekeeper, or a gateway. In step 405, a decision is made as to whether provisioning data is available to route the call. If the provisioning data is not available, the process advances to step 410 to provision the route, then to step 415 for storing the provisioning data before returning to decision step 405.

If, on the other hand, if it is determined in step 405 that provisioning data is available, then the process continues to step 420 for generating a route. In a preferred embodiment of the invention, step 420 may result in the generation of information for both a preferred route, and one or more alternative routes. The alternative routes may further be ranked from best to worst.

The routing information for a call could be simply information identifying the destination gateway to which a call should be routed. In other instances, the routing information could include information identify the best Internet Service Provider to use to place the call traffic onto the Internet. In addition, the routing controller may know that attempting to send data packets directly from the originating gateway to the destination gateway is likely to result in a failed call, or poor call quality due to existing conditions on the Internet. In these instances, the routing information may include information that allows the data packets to first be routed from the originating gateway to one or more interim gateways, and then from the interim gateways to the ultimate destination gateway. The interim gateways would simply receive the data packets and immediately forward the data packets on to the ultimate destination gateway.

Step 420 may also include updating the call state library, for example with a call state of "set up" once the route has been generated. Next, a CDR may be generated in step 425. Once a CDR is available, the CDR may be stored in step 430 and sent to the traffic analysis engine in step 435. In one embodiment, steps 430 and 435 may be performed in parallel, as shown in FIG. 4. In alternative embodiments, steps 430 and 435 may be performed sequentially. In yet other embodiments, only step 430 or only step 435 may be performed.

Figure 5:
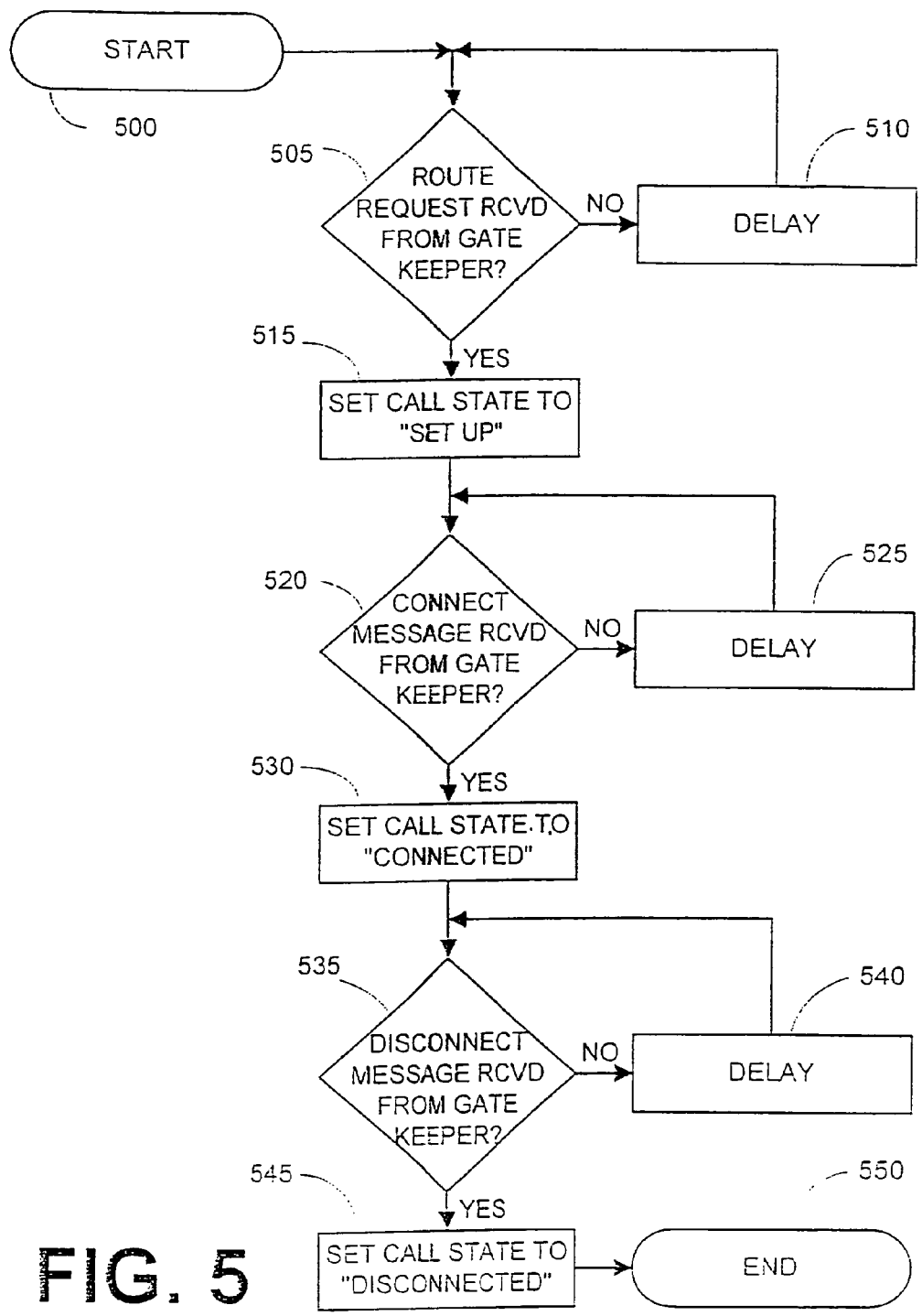
FIG. 5 is a flow diagram illustrating a method for maintaining a call state, according to a preferred embodiment of the invention.

FIG. 5 is a flow diagram illustrating a method for maintaining a call state, which may be performed by routing engine 305. After starting in step 500, the process may determine in step 505 whether a route request has been received from a gatekeeper or other source. If a routing request has not been received, the process may advance to a delay step 510 before returning to decision step 505. If, however, it is determined in step 505 that a route request has been received, then a call state may be set to "set up" in step 515.

The process of FIG. 5 may then determine in step 520 whether a connect message has been received from a gatekeeper or other source. If a connect message has not been received, the process may advance to delay step 525 before returning to decision step 520. If, however, it is determined in step 520 that a connect message has been received, then a call state may be set to "connected" in step 530.

The process of FIG. 5 may then determine in step 535 whether a disconnect message has been received from a gate keeper or other source. If a disconnect message has not been received, the process may advance to delay step 540 before returning to decision step 535. If, however, it is determined in step 535 that a disconnect message has been received, then a call state may be set to "disconnected" in step 545 before the process ends in step 550.

The process depicted in FIG. 5 will operate to keep the call state for all existing calls up to date to within predetermined delay limits. In alternative embodiments of the invention, the call state monitoring process can monitor for other call states such as "hang-up," "busy," or other call states not indicated above. Moreover, monitoring for other call states may be instead of, or in addition to, those discussed above. Further, in one embodiment, monitoring could be performed in parallel, instead of the serial method illustrated in FIG. 5.

Figure 6:
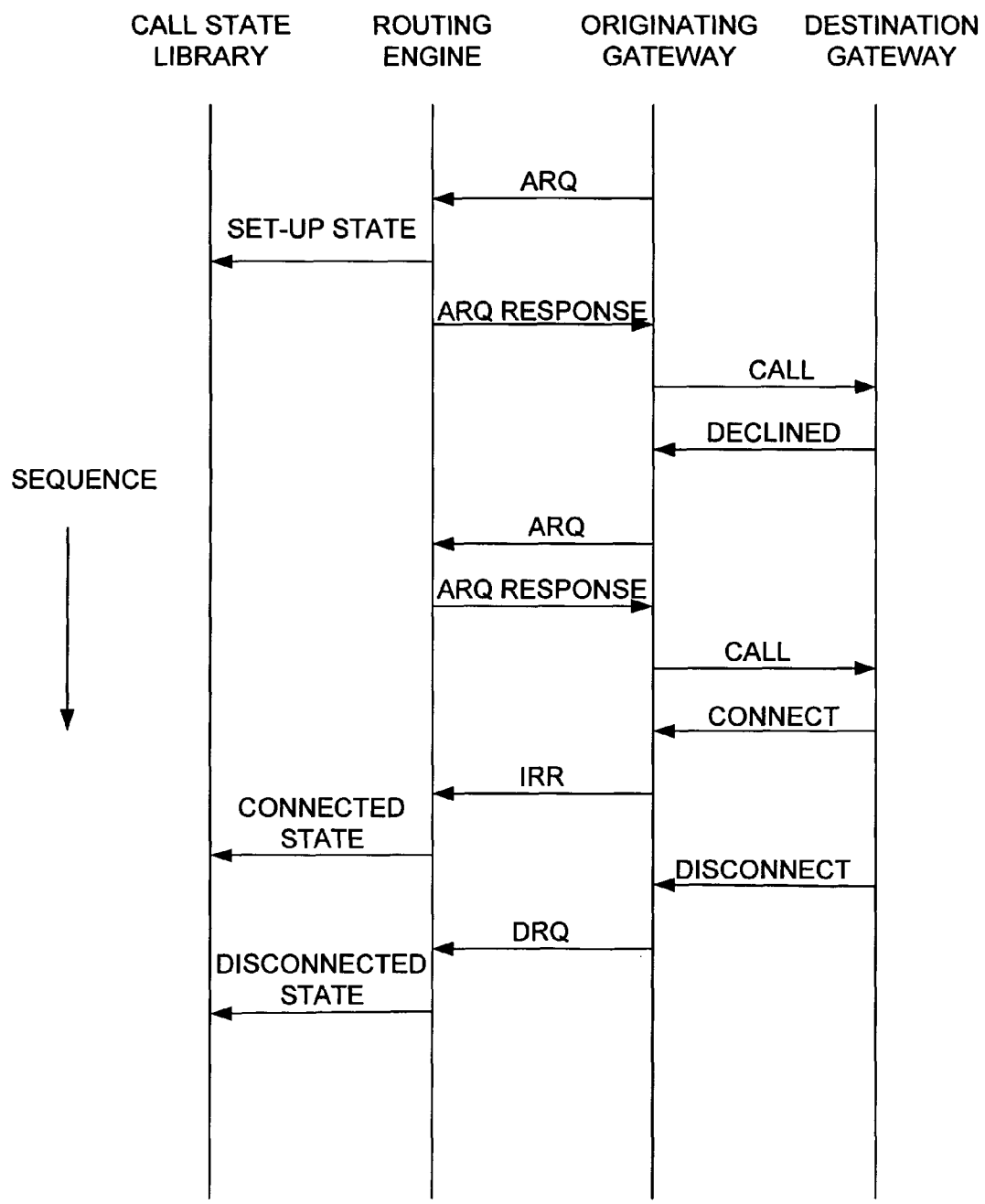
FIG. 6 is a sequence diagram illustrating a method for communicating between functional nodes of a VoIP network, according to a preferred embodiment of the invention.

FIG. 6 discloses a sequence of messages between an originating gateway, a routing engine, a call state library, and a destination gateway, according to a preferred embodiment of the invention. In operation of the network, the originating gateway may send a first request for routing information, in the form of a first Admission Request (ARQ) message, to a routing engine within a routing controller. The request would probably be passed on through a gatekeeper logically positioned between the gateway and the routing engine in the routing controller.

Upon receipt of the routing request, the routing engine may store a set-up state in call state library. The routing engine may then determine a best route based upon one or more predetermined attributes such as the selected carrier service provider, a desired Quality of Service (QoS), cost, or other factors. The routing engine may then send information pertaining to the best route to the originating gateway, possibly via a gatekeeper, as a first ARQ response message. The gateway would then initiate a first call to a destination gateway using the information contained within the response message. As shown in FIG. 6, the destination gateway may return a decline message to the originating gateway.

When the originating gateway receives a decline message, the gateway may send a second request for routing information, in the form of a second ARQ message, to routing engine. Routing engine may recognize the call as being in a set up state, and may determine a next best route for completion of the call. Routing engine may then send a second ARQ response message to the originating gateway. The originating gateway may then send a second call message to the same or a newly selected destination gateway using the next best route. In response to the second call message, the destination gateway may return a connect message to the originating gateway.

The routing engine may use a conference ID feature of the H.323 protocol, which is unique to every call, in order to keep track of successive routing attempts. Thus, upon receiving a first ARQ for a particular call, routing engine may respond with a best route; upon receiving a second ARQ associated with the same call, routing engine may respond with the second best route. If the second call over the next best route does not result in a connection, the originating gateway may send a third ARQ message to routing engine, and so on, until an ARQ response message from routing engine enables a call to be established between the originating gateway and a destination gateway capable of completing the call to the called party.

In alternative embodiments of the invention, the initial ARQ response from the routing engine to the originating gateway may include information about the best route, and one or more next-best routes. In this instance, when a call is declined by one terminating gateway, the originating gateway can simply attempt to route the call using the next-best route without the need to send additional queries to the routing engine.

Once the originating gateway receives a connect message from a destination gateway, the originating gateway may send an Information Request Response (IRR) message to the routing engine to indicate the connect. In response, the routing engine may store a connected state message to the call state library.

After a call is connected, a call may become disconnected. A disconnect may occur because a party has hung up, because of a failure of a network resource, or for other reasons. In this instance, destination gateway may send a disconnect message to the originating gateway. In response, originating gateway may send a Disengage Request (DRQ) message to the routing engine. The routing engine may then update the call state by storing a disconnected state status in the call state library.

Figure 7:
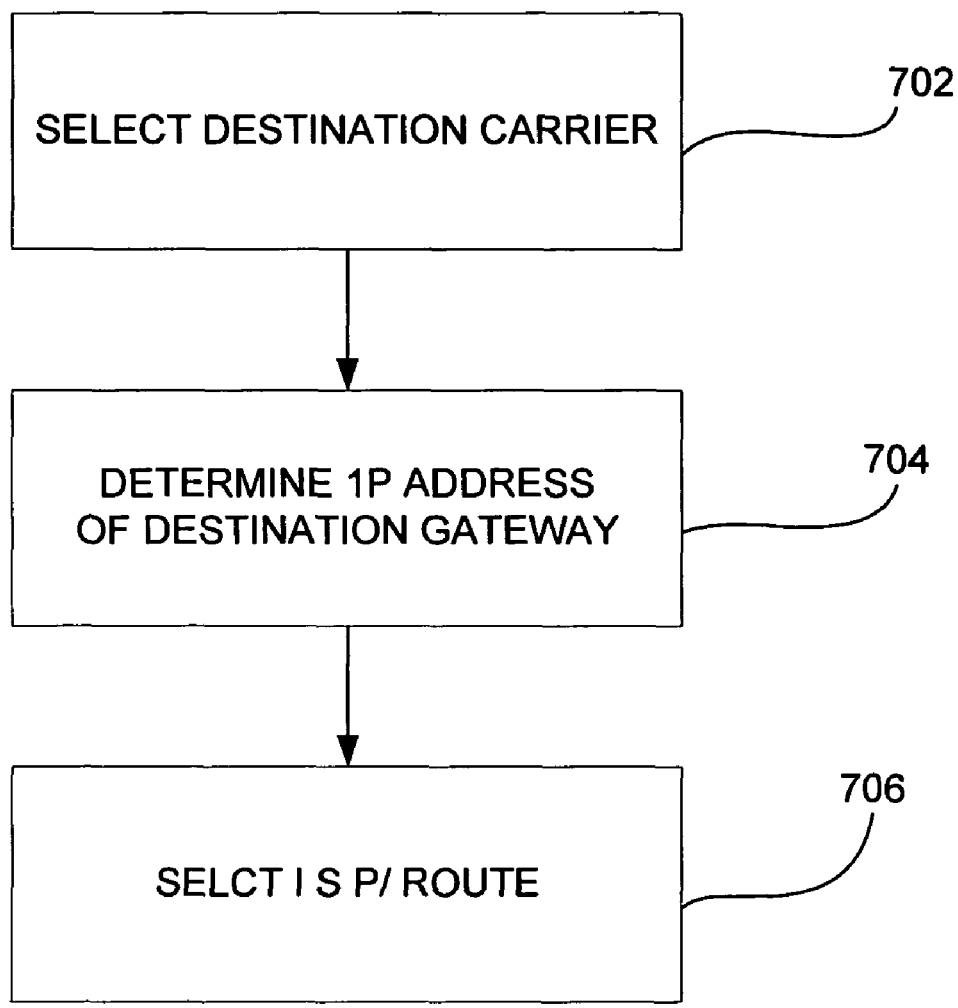
FIG. 7 is a flow diagram illustrating a three level routing method, according to a preferred embodiment of the invention.

FIG. 7 is a flow diagram illustrating a method, according to a preferred embodiment of the invention, for generating routing information in response to a routing request. As shown in FIG. 7, when a routing controller (or a gatekeeper) receives a routing request from a gateway, the method first involves selecting a destination carrier that is capable of completing the call to the destination telephone in step 702. In some instances, there may be only one destination carrier capable of completing the call to the destination telephone. In other instances, multiple destination carriers may be capable of completing the call. In those instances where multiple carriers are capable of completing the call, it is necessary to initially select one destination carrier. If the call is completed on the first attempt, that carrier will be used. If the first attempt to complete the call fails, the same or a different carrier may ultimately be used to complete the call.

Where there are multiple destination carriers capable of completing the call, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between the system operator and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

Once the destination carrier has been selected, the method would include identifying an IP address of a destination gateway connected to the destination carrier and capable of passing the call on to the destination carrier. The destination gateway could be operated by the system operator, or by the destination carrier, or by a third party. Typically, a table would be consulted to determine which destination gateways correspond to which destination carriers and geographic locations.

Often there may be multiple destination gateways capable of completing a call to a particular destination carrier. In this situation, the step of determining the IP address could include determining multiple destination IP addresses, each of which correspond to destination gateways capable of completing the call to the destination carrier. Also, the IP address information may be ranked in a particular order in recognition that some destination gateways may offer more consistent or superior IP quality. Also, if two or more destination gateways capable of completing a call to a destination carrier are operated by different parties, there may be cost considerations that are also used to rank the IP address information. Of course, combinations of these and other considerations could also be used to select particular destination gateways, and to thus determine the IP address(es) to which data packets should be sent.

In some embodiments of the invention, determining the IP address(es) of the terminating gateway(s) may be the end of the process. This would mean that the system operator does not care which Internet Service Provider (ISP) or which route is used to place data traffic onto the Internet. In other instances, the method would include an additional step, step 806, in which the route onto the Internet and/or the ISP would then be selected. The selection of a particular ISP may be based on a quality of service history, the cost of carrying the data, or various other considerations. The quality of service history may take into account packet loss, latency and other IP based considerations. Also, one ISP may be judged superior at certain times of the day/week, while another ISP may be better at other times. As will be described in more detail below, the system has means for determining the quality of service that exists for various routes onto the Internet. This information would be consulted to determine which route/ISP should be used to place call data onto the Internet. Further, as mentioned above, in some instances, the routing information may specify that the call data be sent from the originating gateway to an interim gateway, and then from the interim gateway to the destination gateway. This could occur, for example, when the system knows that data packets placed onto the Internet at the originating gateway and addressed directly to the destination gateway are likely to experience unacceptable delays or packet loss.

In some instances, the quality of service can be the overriding consideration. In other instances, the cost may be the primary consideration. These factors could vary client to client, and call to call for the same client.

For example, the system may be capable of differentiating between customers requiring different call quality levels. Similarly, even for calls from a single customer, the system may be capable of differentiating between some calls that require high call quality, such as facsimile transmissions, and other calls that do not require a high call quality, such as normal voice communications. The needs and desires of customers could be determined by noting where the call originates, or by other means. When the system determines that high call quality is required, the system may eliminate some destination carriers, destination gateways, and ISPs/routes from consideration because they do not provide a sufficiently high call quality. Thus, the system may make routing decisions based on different minimum thresholds that reflect different customer needs.

Figure 8:
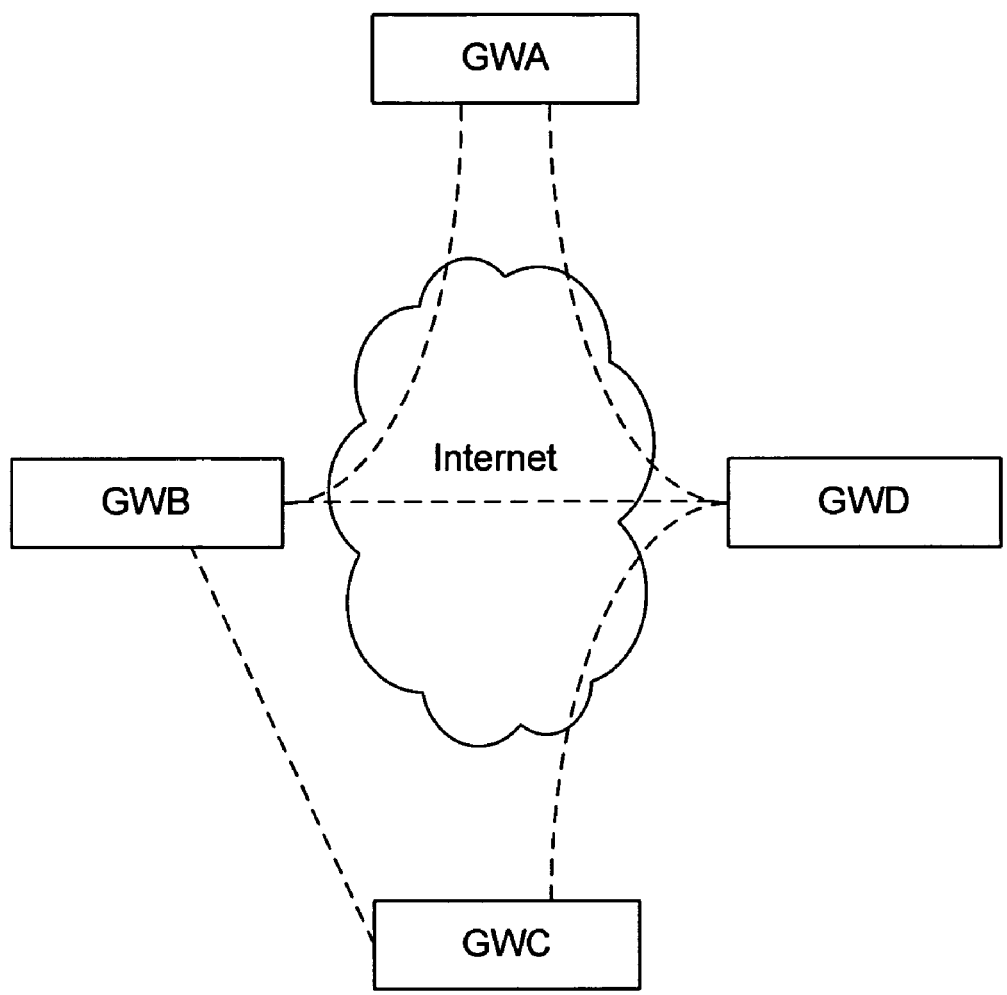
FIG. 8 is a schematic diagram of a system architecture embodying the invention.

FIG. 8 shows a conceptual diagram of four gateways with access to the Internet. Gateway A can reach Gateways B and C via the Internet. Gateway C can reach Gateway D via the Internet, and Gateway B via an external connection. Due to Internet conditions, it will often be the case that certain Gateways, while having access to the Internet, cannot reliably send data packets to other gateways connected to the Internet. Thus, FIG. 8 shows that Gateway C cannot reach Gateways B or A through the Internet. This could be due to inordinately long delays in sending data packets from Gateway C to Gateways A and B, or for other reasons.

The gateways illustrated in FIG. 8 could be gateways controlled by the system operator. Alternatively, some of the gateways could be maintained by a destination carrier, or a third party. As a result, the gateways may or may not be connected to a routing controller through a gatekeeper, as illustrated in FIG. 2. In addition, some gateways may only be capable of receiving data traffic and passing it off to a local or national carrier, while other gateways will be capable of both receiving and originating traffic.

Some conclusions logically flow from the architecture illustrated in FIG. 8. For instance, Gateway B can send data traffic directly to Gateway D through the Internet, or Gateway B could choose to send data to Gateway D by first sending the traffic to Gateway A, and then having Gateway A forward the traffic to Gateway D. In addition, Gateway B could send the traffic to Gateway C via some type of direct connection, and then have Gateway C forward the data on to Gateway D via the Internet.

The decision about how to get data traffic from one gateway to another depends, in part, on the quality of service that exists between the gateways. The methods embodying the invention that are described below explain how one can measure the quality of service between gateways, and then how the quality measurements can be used to make routing decisions.

As is well known in the art, a first gateway can "ping" a second gateway. A "ping" is a packet or stream of packets sent to a specified IP address in expectation of a reply. A ping is normally used to measure network performance between the first gateway and the second gateway. For example, pinging may indicate reliability in terms of a number of packets which have been dropped, duplicated, or re-ordered in response to a pinging sequence. In addition, a round trip time, average round trip time, or other round trip time statistics can provide a measure of system latency.

In some embodiments of the invention, the quality of service measurements may be based on an analysis of the round trip of a ping. In other embodiments, a stream of data packets sent from a first gateway to a second gateway could simply be analyzed at the second gateway. For instance, numbered and time-stamped data packets could be sent to the second gateway, and the second gateway could determine system latency and whether packets were dropped or reordered during transit. This information could then be forwarded to the routing controller so that the information about traffic conditions between the first and second gateways is made available to the first gateway.

A system as illustrated in FIG. 8 can use the data collected through pings to compare the quality and speed of a communication passing directly between a first gateway and a second gateway to the quality and speed of communications that go between the first and second gateways via a third or intermediate gateway. For instance, using the system illustrated in FIG. 8 as an example, the routing controller could hold information about traffic conditions directly between Gateway B and Gateway D, traffic conditions between Gateway B and Gateway A, and traffic conditions between Gateway A and Gateway D. If Gateway B wants to send data packets to Gateway D, the routing controller could compare the latency of the route directly from Gateway B to Gateway D to the combined latency of a route that includes communications from Gateway B to Gateway A and from Gateway A to Gateway D. Due to local traffic conditions, the latency of the path that uses Gateway A as an interim Gateway might still be less than the latency of the direct path from Gateway B to Gateway D, which would make this route superior.

In methods embodying the invention, each gateway capable of directly accessing another gateway via the Internet may periodically ping each of the other gateways. The information collected from the pings is then gathered and analyzed to determine one or more quality of service ratings for the connection between each of the gateways. The quality of service ratings can then be organized into tables, and the tables can be used to predict whether a particular call path is likely to provide a given minimum quality of service.

To reduce the amount of network traffic and the volume of testing, only one gateway within a group of co-located gateways may be designated as a proxy tester for all gateways within the co-located group. In addition, instead of pinging a far-end gateway, one might ping other Internet devices that are physically close to the far-end gateway. These steps save network bandwidth by reducing the required volume of testing. Also, the testing can be delegated to lower cost testing devices, rather than expensive gateways.

A quality of service measure would typically be calculated using the raw data acquired through the pinging process. As is well known to those of skill in the art, there are many different types of data that can be derived from the pinging itself, and there is an almost infinite variety of ways to combine this data to calculate different quality of service measures.

FIG. 9 is a diagram of a matrix of quality of service data that indicates the quality of service measured between 10 different gateways, gateways A-J. This table is prepared by having each of the gateways ping each of the other gateways. The data collected at a first gateway is then collected and used to calculate a quality of rating between the first gateway and each of the other gateways. A similar process of collection and calculation occurs for each of the other gateways in the system. The calculated quality of service values are then inserted into the matrix shown in FIG. 9. For instance, the quality measure value at the intersection of row A and column D is 1.8. Thus, the value of 1.8 represents the quality of service for communications between Gateways A and D. When an X appears in the matrix, it means that no communications between the row and column gateways was possible the last time the pings were collected.

Although only a single value is shown in the matrix illustrated in FIG. 9, multiple quality of service values could be calculated for communications between the various gateways. In other words, multiple values might be stored at each intersection point in the matrix. For instance, pings could be used to calculate the packet loss (PL), latency (LA), and a quality of service value (Q) which is calculated from the collected pinging data. In this instance, each intersection in the matrix would have an entry of "PL, LA, Q". Other combinations of data could also be used in a method and matrix embodying the invention.

The pinging, data collection and calculation of the values shown in the matrix could be done in many different ways. Two alternative methods are illustrated in FIGS. 10A and 10B.

Figure 10A:
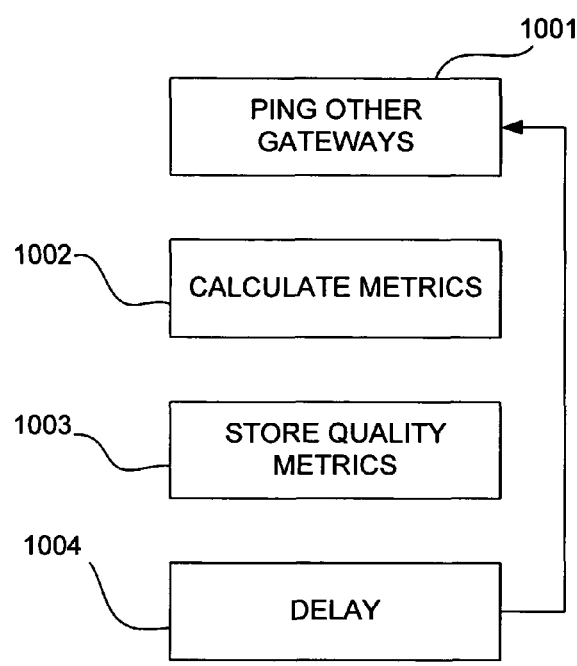
FIGS. 10A and 10B are flow diagrams of alternate methods of obtaining quality of service data for alternate communications paths.

In the method shown in FIG. 10A, pinging occurs in step 1001. As discussed above, this means that each gateway pings the other gateways and the results are recorded. In step 1002, the data collected during the pinging step is analyzed and used to calculate various quality measures. In step 1003, the quality metrics are stored into the matrix. The matrix can then be used, as discussed below, to make routing decisions. In step 1004, the method waits for a predetermined delay period to elapse. After the delay period has elapsed, the method returns to step 1001, and the process repeats.

It is necessary to insert a delay into the method to avoid excessive pinging from occurring. The traffic generated by the pinging process takes up bandwidth that could otherwise be used to carry actual data traffic. Thus, it is necessary to strike a balance between conducting the pinging often enough to obtain accurate information and freeing up the system for actual data traffic. In addition, the bandwidth used by testing can also be managed by controlling the number of pings sent per test. Thus, the consumption of bandwidth is also balanced against the ability to measure packet loss.

Figure 10B:
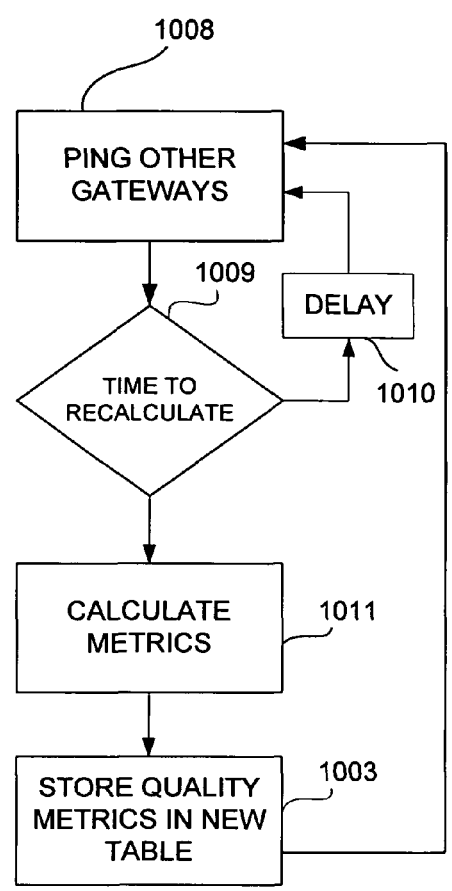

The alternate method shown in FIG. 10B begins at step 1008 when the pinging process is conducted. Then, in step 1009, the system determines whether it is time to re-calculate all the quality of service metrics. This presupposes that the matrix will only be updated at specific intervals, rather than each time a pinging process is conducted. If it is not yet time to update the matrix, the method proceeds to step 1010, where a delay period is allowed to elapse. This delay is inserted for the same reasons discussed above. Once the delay period has elapsed, the method returns to step 1008 where the pinging process is repeated.

If the result of step 1009 indicates that it is time to recalculate the quality metrics, the method proceeds to step 1011, where the calculations are performed. The calculated quality metrics are then stored in the matrix in step 1013, and the method returns to step 1008. In this method, the matrix is not updated as frequently, and there is not as high a demand for performing the calculations. This can conserve valuable computer resources. In addition, with a method as illustrated in FIG. 10B, there is data from multiple pings between each of the gateways for use in making the calculations, which can be desirable depending on the calculations being performed. In some embodiments of the invention, once the Quality Metrics have been updated, the system may wait for a delay period to elapse before returning to step 1008 to restart the pinging process. Furthermore, the system may conduct a certain amount of pinging, then wait before calculating the metrics. In other words, the pinging and calculating steps may be on completely different schedules.

In either of the methods described above, the data used to calculate the quality metrics could include only the data recorded since the last calculations, or additional data recorded before the last set of quality metrics were calculated. For instance, pinging could occur every five minutes, and the quality metrics could be calculated every five minutes, but each set of calculations could use data recorded over the last hour.

Figure 11:
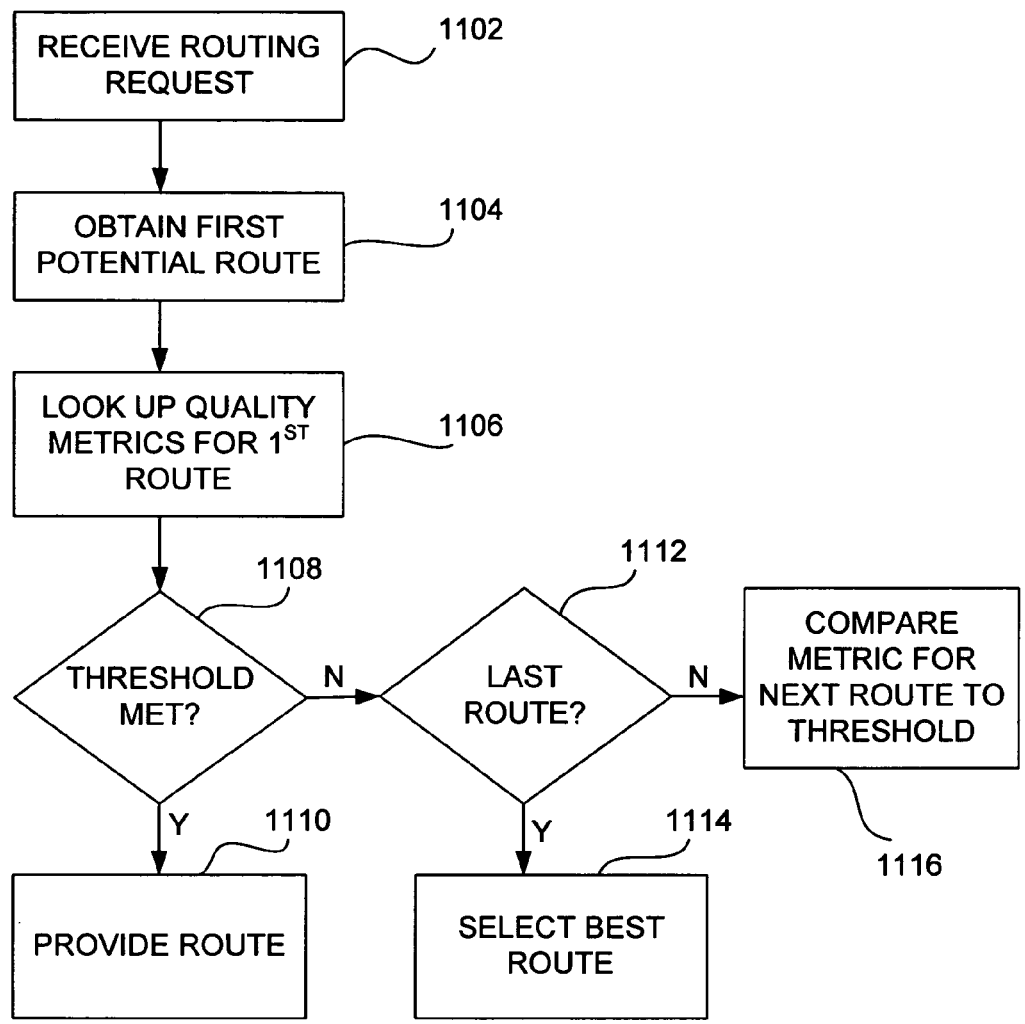
FIG. 11 is a flow diagram of a method for making routing decisions according to a preferred embodiment of the present invention.

FIG. 11 illustrates a method embodying the invention for selecting and providing routing information to a gateway making a routing request. This method would typically be performed by the gatekeeper connected to a gateway, or by the routing controller.

In step 1102, a routing request would be received. In step 1104, the system would obtain a first potential route. This step could involve all of the considerations discussed above relating to the selection of a destination carrier and/or destination gateway and/or an ISP or route between the originating gateway and the destination gateway.

Once the first potential route is determined, in step 1106 the system would look up the quality metrics associated with communications between the originating and destination gateways. This would involve consulting the quality matrix discussed above. One or more quality values in the matrix relating to the first proposed route would be compared to a threshold value in step 1108. If the quality for the first route satisfies the threshold, the method would proceed to step 1110, and the route would be provided to the requesting gateway as a potential route for completion of a call.

If the result of comparison step 1108 indicates that the quality of service metrics for the first route do not satisfy the threshold, then in step 1112 the system would determine if this is the last available route for completing the call. If so, the method would proceed to step 1114, where the best of the available routes would be determined by comparing the quality metrics for each of the routes considered thus far. Then the method would proceed to step 1110, where the best available route would be provided to the requesting gateway.

If the result of step 1112 indicates that there are alternative routes available, the method would proceed to step 1116, where the quality metrics for the next available route would be compared to the threshold value. The method would then proceed to step 1108 to determine if the threshold is satisfied.

A method like the one illustrated in FIG. 11 could be used to identify multiple potential routes for completing a call that all satisfy a basic threshold level of service. The quality metrics associated with each route could then be used to rank the potential routes. Alternatively, the cost associated with each route could be used to rank all routes satisfying the minimum quality of service threshold. In still other alternative embodiments, a combination of cost and quality could be used to rank the potential routes. As explained above, the ranked list of potential routes could then be provided to the requesting gateway.

As also explained above, in providing a route to a gateway, the routing controller may specify either a direct route between the gateways, or a route that uses an interim gateway to relay data packets between an originating and destination gateway. Thus, the step of identifying a potential route in step 1104 could include identifying both direct routes, and indirect routes that pass through one or more interim gateways. When interim gateways are used, the quality metrics for the path between the originating gateway and the interim gateway and the path between the interim gateway and the destination gateway would all have to be considered and somehow combined in the comparison step.

In a system embodying the invention, as shown in FIG. 2, multiple different gateways are all routing calls using routing information provided by the routing controller 200. The routing information stored in the routing controller includes tables that are developed using the methods described above. The routing table indicates the best available routes between any two gateways that are connected to the system. Even when there are multiple routing controllers that are a part of the system, all routing controllers normally have the same routing table information. This means that each time a gateway asks for a route to a destination telephone number, the routing information returned to the gateway will be the same, regardless of which gateway made the routing request. As will be explained below, in prior art systems, the fact that all gateways receive the same routing information can lead to unnecessary signaling and looping of call setup requests.

Figure 12:
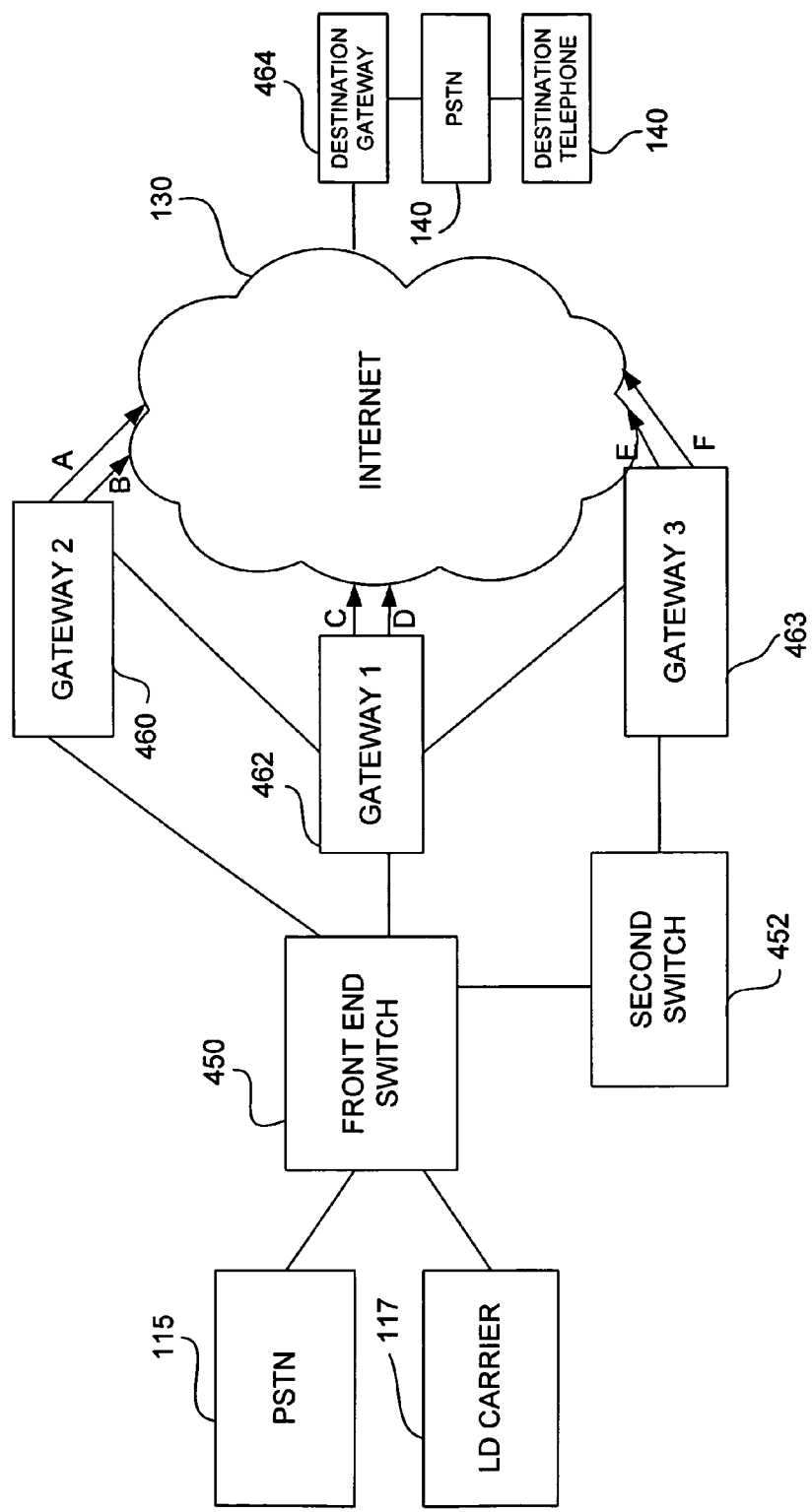
FIG. 12 is a schematic diagram of a system architecture for routing traffic over the Internet, according to a second embodiment of the present invention.

FIG. 12 shows the basic architecture of a system embodying the invention. As shown therein, the PSTN 115 and/or a long distance carrier 117 both deliver calls to a front end switch 450 of the system. The calls arrive at the front end switch 450 as a call set-up request to complete a call to the destination telephone 145. The front end switch 450 or the Source Gateway 460 can then consult a route controller, wherein the route controller determines the most optimal route and a gateway associated with the most optimal route, which can convert the call into digital data packets and place the packets on to the Internet properly addressed to the designation gateway 464. Additionally, a destination gateway may be chosen from a plurality of destination gateways depending on such criteria as, but not limited to, compatibility, dependability, and efficiency. The route controller ranks the routes from the most optimal to least optimal.

Once a route is identified, the call request would be formatted as digital data packets that include header data with routing information. For example the header can include information such as the originating gateway associated with the most optimal route, the destination gateway, and the destination telephone number. The Source Gateway 460 then attempts to complete the call to the destination gateway.

Each of the individual gateways can place data traffic onto the Internet using one or more routes or access points. In the system illustrated in FIG. 12, Source Gateway 460 can place traffic onto the Internet using route C or D. The First Transmitting Gateway 462 can place traffic on the Internet using routes A and B. The Second Transmitting Gateway 463 can place traffic onto the Internet using routes E and F. At any given point in time, one or more of these routes can become inoperative or simply degraded in performance to the point that making a voice call through the route results in poor call quality.

In prior art systems, when the front end switch 450 receives a call request for a call intended for the destination telephone 145 from either the PSTN 115 or the long distance carrier 117, the front end switch would forward the call to one of the gateways so that the call setup procedures could be carried out. For purposes of explanation, assume that the call request is forwarded to Source Gateway 460. The gateway would then make a routing request to the routing controller for information about the address of the destination gateway, and the most preferable route to use to get the data onto the Internet. Again, for purposes of explanation, assume that the routing controller responds with the address of the destination gateway 464, and with the information that the best routes, in preferred order, are routes C, then A, and then E.

With this information, Source Gateway 460 would first try to set the call up to go to the destination gateway 464 via route C. Assume that for whatever reason, route C fails. Source Gateway would then consult the routing information again and determine that the next best route is route A. Thus, Source Gateway would forward the call on to the First Transmitting Gateway 462, which is capable of using route A.

When the First Transmitting Gateway 462 receives the call request, it too will consult the routing controller for routing information. The same information will be returned to the First Transmitting Gateway 462, indicating that the preferred routes are C, then A, then E. With this information, the First Transmitting Gateway 462 believes that route C is the best route, so the First Transmitting Gateway 462 would bounce the call request back to Source Gateway 460, so that the call could be sent through route C. Source Gateway would receive back the same call request it just forwarded on to the First Transmitting Gateway 462. Depending on the intelligence of the Source Gateway, the Source Gateway might immediately send a message to the First Transmitting Gateway 462 indicating that route C has already been attempted and that this route failed. Alternatively, Source Gateway might again try to send the call via route C. Again the route would fail. Either way, the call request would ultimately be bounced back to the First Transmitting Gateway 462 with an indication that the call could not be sent through route C.

When the First Transmitting Gateway 462 gets the call request back from the Source Gateway, it would then consult its routing information and determine that the next route to try is route A. If route A is operable, the call could then be setup between the First Transmitting Gateway 462 and the destination gateway 464 via route A. Although this process eventually results in a successful call setup, there is unnecessary call signaling back and forth between the Source Gateway 460 and the First Transmitting Gateway 462.

Moreover, if the First Transmitting Gateway 462 is unable to set up the call through route A, the First Transmitting Gateway 462 would again consult the routing information it received earlier, and the First Transmitting Gateway 462 would send the call to the Second Transmitting Gateway 463 so that the call can be placed onto the Internet using route E. When the Second Transmitting Gateway 463 receives the call request from the First Transmitting Gateway 462, it too would consult the routing controller and learn that the preferred routes are route C, then route A, then route E. With this information, the Second Transmitting Gateway 463 would forward the call request back to the Source Gateway 460 with instructions to place the call through route C, which would fail again. The Source Gateway 460 would then forward the call back to the Second Transmitting Gateway 463. The Second Transmitting Gateway 463 would then try to complete that call using the First Transmitting Gateway 462 and route A. This too would fail. Finally, the Second Transmitting Gateway 463 would send the call out using route E.

Because each of the gateways are using the same routing information, when one or more routes fail, there can be a large amount of unnecessary looping and message traffic between the gateways as the a call request is passed back and forth between the gateways until the call is finally placed through an operative route. In preferred embodiments of the invention, special routing procedures are followed to reduce or eliminate unnecessary looping.

In preferred embodiments of the invention, if the call attempt fails, the call attempt returns to the Source Gateway 460. The Source Gateway 460 can then query the route controller for a second most optimal route. If the second most optimal route is located through First Transmitting Gateway 462, the route controller attaches a second set of header information identifying the new route to the data packets that comprise the call set up request. The new header information identifies the First Transmitting Gateway 462. The Source Gateway 460 then forwards the second call set-up request to the First Transmitting Gateway 462. The First Transmitting Gateway 462 is configured to strip off the portion of the header data which identifies itself. The First Transmitting Gateway 462 then sends the call setup request on to the Destination Gateway 464. If the second call attempt fails, the data packets are returned to the Source Gateway 460 because the header data identifying the First Transmitting Gateway 462 has been removed. It should be noted that any gateway can be the Source Gateway 460 as long as it is associated with the most optimal route. It should also be noted that any transmitting gateway may be configured to automatically strip off a portion of the header that identifies itself.

To be more specific, if the route controller determined that route C is the most optimal route, the translated header information inserted onto the data packets containing the call setup request would include an identification of the Source Gateway 460, because that is where the route is located, plus the destination gateway 464, plus the destination telephone number. The Source Gateway 460 then attempts the call setup by sending the data packets to the Destination Gateway 464. If the call attempt is successful, the call connection is completed. However, if the call attempt fails, for any reason, it is returned to the Source Gateway 460.

The gatekeeper then queries the route controller for a second most optimal route. For example, in FIG. 12, the second most optimal route may be route A, which is located through the First Transmitting Gateway 462. The Source Gateway 460 would then insert new header information, consisting of the identification of the First Transmitting Gateway 462 in front of the existing header information. The Source Gateway 460 then forwards the call set-up request, with the new header information, to the First Transmitting Gateway 462. The First Transmitting Gateway 462 reads the header information and discovers that the first part of the header information is its own address. The First Transmitting Gateway 462 will then strip off its own identification portion of the header. The First Transmitting Gateway 462 then attempts a call setup to the destination gateway 464. If the second call attempt fails, the destination gateway 464 returns the call attempt to the Source Gateway 460, because the remaining portion of the header only identifies the Source Gateway 460. Thus, rather than bouncing the call attempt back to the First Transmitting Gateway 462, the failed call attempt would simply return to the Source Gateway 460, which tracks route failure and remaining optimal route information. This method can eliminate or reduce unnecessary looping.

In a second embodiment, each of the gateways will know which routes are associated with each gateway. Alternatively, this information may be provided by the routing controller as needed. This means that the First Transmitting Gateway 462 would know that the Source Gateway 460 uses routes C and D, and that the Second Transmitting Gateway 463 uses routes E and F. The gateways can then use this information to reduce or eliminate unnecessary looping.

For instance, using the same example as described above, when a call request comes in to place a call to destination telephone 145, the Source Gateway 460 would first try to send the call via route C. When that route fails, the Source Gateway 460 would send the call request to the First Transmitting Gateway 462 so that the First Transmitting Gateway 462 could send the call via route A. In the prior art system, the First Transmitting Gateway 462 would have bounced the call request back to the Source Gateway 460 because the First Transmitting Gateway 462 would believe that route C is the best way to route that call. But in a system embodying the invention, the First Transmitting Gateway 462 would know that the Source Gateway 460 uses route C. With this knowledge, and knowing that the call request came from the Source Gateway 460, the First Transmitting Gateway 462 would conclude that the Source Gateway 460 must have already tried to use route C, and that route C must have failed. Thus, rather than bouncing the call request back to the Source Gateway 460, the First Transmitting Gateway 462 would simply try the next best route, which would be route A. Similar logic can be used at each of the other gateways to eliminate unnecessary looping.

In another preferred embodiment, special addressing information can be included in the messages passing back and forth between the gateways. For instance, and again with reference to the same example described above, assume that the Source Gateway 460 first gets a call request to complete a call to destination telephone 145. The Source Gateway 460 would try to send the call via route C, and route C would fail. At this point, the Source Gateway 460 would know that the next best route is route A. In this embodiment, before sending the call request on to the First Transmitting Gateway 462, the Source Gateway 460 could encode a special addressing message into the call request. The special addressing message would inform the First Transmitting Gateway 462 that the call request should be sent via a specific route. In the example, the Source Gateway 460 would include addressing codes that indicate that the call request should be sent via route A, since that is the next best route.

When the First Transmitting Gateway 462 receives the call request, it would read the special routing information and immediately know that the call should be sent via route A. If route A is operable, the call will immediately be sent out using route A. If route A is not available, the First Transmitting Gateway 462 would consult the routing controller and determine that the next route to try is route E. The First Transmitting Gateway 462 would then send the call request on to the Second Transmitting Gateway 463 with special addressing information that tells the Second Transmitting Gateway 463 to immediately try to place the call using route E. In this manner, unnecessary looping can be eliminated.

The call setup process will now be described with reference to FIG. 2. In particular, methods of checking to determine if a call is profitable will be discussed.

In existing VoIP systems, the system will normally check to determine if completing a call will be profitable before the call is actually completed. This profitability check is done when the call is in the setup state. The profitability check is made using information about what a customer will pay for a call, and information about what it will cost to complete the call through a destination gateway.

A call setup request can be received from a customer in a number of ways. For instance, and with reference to FIG. 2, a call setup request may be received from a customer over the Public Switched Telephone Network 115, from a direct link with a long distance service provider 117, or through some other means. The originating gateway 125/126 that receives the call setup request will then determine where the call is going, and it will request routing information from the routing controller 200. The routing controller will provide the addresses of one or more destination gateways that are capable of completing the call to the called party.

The originating gateway will then contact the first potential destination gateway to determine if the first potential destination gateway is available to complete the call, and if so, what the destination gateway will charge for completing the call. The destination gateway will return cost information to the originating gateway that is indicative of what it will charge to complete the call. This cost information is typically in the form of a cost code that is indicative of the cost per unit of time.

The originating gateway will then compare the cost of completing the call through the destination gateway to what it will receive from the client for placing the call. If the call is sufficiently profitable, the originating gateway will complete the call setup procedures with the destination gateway, and the called party's telephone will begin to ring.

If the call will not be sufficiently profitable, then the originating gateway will look for an alternate, less costly way to route the call. Usually this means looking to the next potential destination gateway on the list originally provided by the routing controller. The originating gateway would simply terminate communications with the first potential destination gateway, and then begin the call setup process again with the second potential destination gateway on the list provided by the routing controller. The originating gateway would receive a cost code from the second potential destination gateway, and the originating gateway would again decide if the call is sufficiently profitable. This process could be repeated several times until the originating gateway finds a destination gateway that is capable of completing the call for a sufficiently high profit.

If the originating gateway has tried all the potential destination gateways, and none of them are capable of completing the call in a profitable manner, the originating gateway will ultimately signal the client that the system cannot place the call. This is referred to as declining the call. However, the signaling that must occur to arrive at this decision is somewhat time consuming, and it can cost significant bandwidth in terms of the signaling that must occur.

In some instances, the originating gateway and the routing controller would signal back and forth as the originating gateway asks for another potential destination gateway, and the routing controller informs the originating gateway that there are no more potential destination gateways and that the call must be declined. In other instances, the routing controller might tell the originating gateway to insert a special prefix onto the DNIS, and then to try completing the call through itself When the originating gateway sees the special prefix in the call setup request that it sent to itself, or possibly just its own address, it would know that the call must be declined. In either instance, however, time and bandwidth is lost in arriving at the decision to decline the call.

A system and method embodying the invention allows the system to make the decision to decline a call using one or more "decline" destination gateways. The "decline" destination gateways are low cost gateway-like devices that are connected to the Internet and that have an address like a regular destination gateway. The decline destination gateways are configured such than when an originating gateway contacts the decline destination gateway to attempt to setup a new call, the decline destination gateway returns a special cost code. The originating gateways know that when they receive the special cost code, they are to immediately decline the call without any further signaling.

In some embodiments, there may be only a single decline destination gateway. In other embodiments, there might be multiple decline destination gateways to ensure that is one fails, another will still be active. Also, if there are multiple decline destination gateways, various ones could be configured for different specific purposes.

Figure 13:
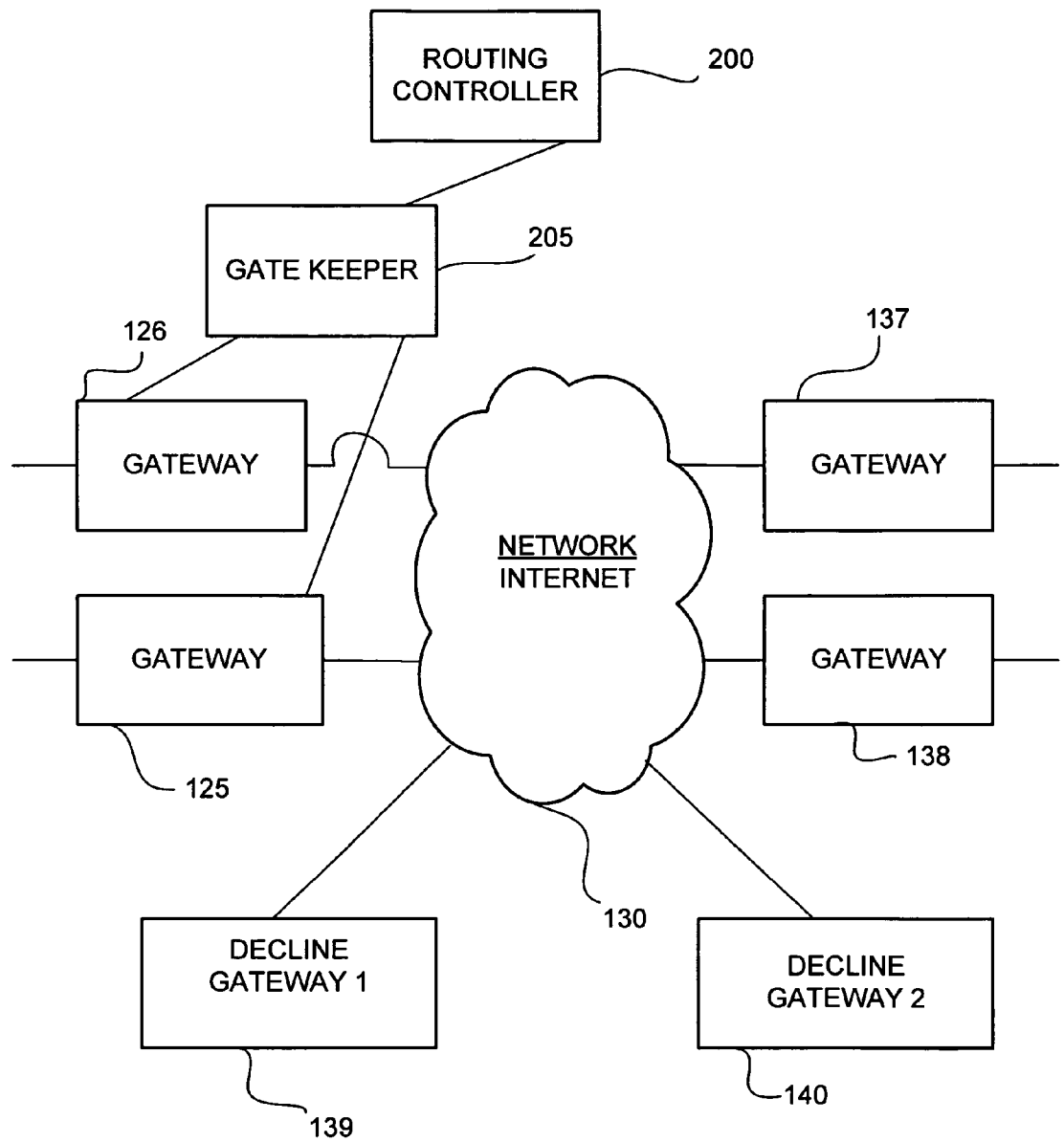
FIG. 13 is a diagram of a system embodying the invention that is configured to treat a call in various different special manners.

This new system will be explained with reference to FIG. 13. In this new system, as in the existing systems, when an originating gateway 125/126 receives a call setup request from a customer, the originating gateway contacts the routing controller 200 to obtain a list of potential destination gateways capable of completing the call to the called party. The routing controller 200 would inform the originating gateway of the address of one or more destination gateways that are capable of completing the call to the called party. However, in this system, the routing controller would include the address of one of the decline destination gateways 139, 140 as the last potential destination gateway to be tried. Thus, the routing controller might list destination gateway 137 as the first choice, destination gateway 138 as the second choice, and the decline destination gateway 139 as the last option.

The originating gateway 125 would then send a call setup signal to the first potential destination gateway 137. The first potential destination gateway 137 would respond to the originating gateway 125 with a cost code that indicates how much it will cost, per unit of time, to complete the call through the first potential destination gateway 137. The originating gateway will then compare the cost of completing the call to the amount the client is willing to pay. If the call is not sufficiently profitable, the originating gateway 125 will terminate the setup with the first potential destination gateway 137. The originating gateway would then contact the second potential destination gateway 138. As before, the second potential destination gateway would return a cost code, and the originating gateway 125 would determine if the call is sufficiently profitable. If the call still cannot be completed for a sufficiently high profit, the originating gateway 125 would terminate the call setup with the second potential destination gateway 138.

At this point, the originating gateway would turn to the last option on the list originally provided by the routing controller, which is the decline destination gateway 139. The originating gateway 125 would send a call setup request to the decline destination gateway 139, and the decline destination gateway 139 would return the special cost code. When the originating gateway receives the special cost code, it would determine that the call should be immediately declined, and it would send a decline message back to the customer.

Thus, in a system and method embodying the invention, the decision to decline the call can be made very quickly, using the same basic software in the originating gateways that is used to cause the originating gateways to send setup requests to other potential destination gateways. There is no need for any special signaling between the originating gateway and the routing controller to arrive at a decision to decline the call. Nor is there necessarily a need to encode special treatment information into the call setup request data, or for the originating gateway to recognize that it is attempting to send a setup request to itself As a result, the decline decision can be made with very little signaling overhead.

In other embodiments of the invention, this same basic system architecture can be used to treat calls in multiple different ways, in addition to simply declining calls. In this alternate embodiment, there would be multiple different decline destination gateways connected to the network, and each decline destination gateway would be used to treat a call in a different fashion. For instance, a first decline destination gateway could be used to return a first special cost code to the originating gateway instructing the originating gateway to decline the call, as explained above. A second decline destination gateway could be used to return a second special cost code to the originating gateway to instruct the originating gateway to re-route the call to an alternate number, such as a customer support line. A third decline destination gateway could be used to return a third special cost code that would instruct the originating gateway to play a pre-recorded message to the calling party, such as "all circuits are busy" or "your call cannot be completed as dialed." Still other decline destination gateways could be used to instruct the originating gateway to treat the call in yet other ways.

In still other embodiments of the invention, the decline destination gateways themselves might be configured to take specific actions. For instance, a decline destination gateway might be configured so that every time it receives a setup request from an originating gateway, the decline destination gateway will simply pickup the call and play a message to the calling party. Alternately, the decline destination gateway might be configured to automatically re-route the call to an alternate telephone number.

In a system having multiple decline destination gateways used for different purposes, the routing controller would usually control how the call is treated. This would be done when the routing controller returns the list of potential destination gateways to the originating gateway as part of the call setup procedures. The decline destination gateway identified by the routing controller would determine how the call is handled.

For instance, if a call setup request is received from a service provider, and the dialed telephone number is not a valid number, then the routing controller could instruct the originating gateway to immediately send the call to a decline destination gateway that would cause a message to played to the calling party that indicates that the call cannot be completed as dialed. This could be accomplished by having the decline destination gateway itself picking up the call and play the message to the calling party. Alternatively, the decline destination gateway could return a special cost code to the originating gateway that would instruct the originating gateway to play the message.

In another situation, the calling party might be seeking to place a call to a person in an area which is already at maximum capacity. In other words, the system is incapable of placing a call to the called party because there are no available circuits that can carry the call. In this instance, the routing controller (which knows the status of all system components) would instruct the originating gateway to place the call to a decline destination gateway that would cause a message to be played indicating that all circuits are busy. Again, the message might be played by the decline destination gateway itself, or by the originating gateway.

In still other embodiments, the routing controller might instruct the originating gateway to route the call to a decline destination gateway that will cause the call to be diverted to an alternate number. Any number of additional call treatments could also be accomplished by other decline destination gateways.

A basic method embodying the invention will now be explained with reference to the flow diagram shown in FIG. 14. For purposes of illustration, the method will be explained as a way of quickly declining a call once all available destination gateways have been tried. However, it should be understood that the same basic method could be used to accomplish any sort of call treatment.

At the beginning of the method, in step S1400, an originating gateway would receive a call setup request from a customer. Then, in step S1402, the originating gateway would consult with a routing controller to obtain the address(es) of one or more destination gateways that could potentially complete the call to the called party. In some instances, the routing controller might only return a single address, even though multiple destination gateways are capable of completing the call. In other instances, the routing controller might return a ranked list of multiple destination gateways capable of completing the call.

In step 1404, the originating gateway would contact the first potential destination gateway, and the potential destination gateway would return a cost code indicative of the cost of completing the call through the destination gateway. In step S1406 the originating gateway would determine if a special cost code was returned by the destination gateway. If so, this would indicate that the special cost code was sent by one of the decline destination gateways, which is a signal to decline the call. In this instance, the method would proceed to step S1412, where the originating gateway would send a decline message back to the customer. As discussed above, the special cost code could also instruct the originating gateway to take some other action, in which case the indicated action would be accomplished by the originating gateway at step S1412.

If the cost code received by the originating gateway was not a special cost code, the method would proceed to step S1408, where the originating gateway would determine if the call can be completed for a sufficiently high profit margin. If so, the method would proceed to step S1410 where the call would be placed through the destination gateway. If not, the originating gateway would determine the address of the next destination gateway to try, and the method would then proceed to step 1404 and the process would be repeated with a new potential destination gateway.

Note, in the first pass through step S1402 the routing controller might only provide the originating gateway with the address of a single destination gateway to try. If that is the case, and if the call cannot be completed for a sufficiently high profit margin through that first potential destination gateway, then the method will ultimately arrive back at step S1402. During the second pass through step S1402 the routing controller would give the originating gateway the address of the next potential destination gateway to try. This process would be repeated until the call is completed through one of the destination gateways, or until there are no more potential destination gateways. If there are no more potential destination gateways, then on the last pass through step S1402, the routing controller would give the originating gateway the address of one of the decline destination gateways.

In other embodiments of the invention, on the first pass thorough step S1402 the routing controller would provide the originating gateway with a list of the addresses of all the potential destination gateways, and the last one listed would be the decline destination gateway. This would allow the originating gateway to try all the other potential destination gateways first, and if none of them can complete the call for a high enough profit margin, then on the last attempt the originating gateway would try the decline destination gateway, which would signal the originating gateway to decline the call.

Also note that the profitability determination performed in step S1408 could have many variations. In some instances, the system might be configured to complete the call through the first destination gateway that can complete the call for a profit, no matter how small the profit margin. In other instances, the originating gateway might be configured to complete the call only if the profit margin rises above a certain level.

In still other embodiments, the originating gateway might decide to complete a call through a destination gateway, even if the call is not profitable. This could occur when the system operator has certain contracts in place with destination service providers which call for a certain volume of calls to be placed through each destination service provider. In this situation, it might make sense to place a call that is not strictly profitable through a first destination service provider because it would result in less of a loss than if the call was placed through a second destination service provider.

In still other embodiments of the invention, the profitability decision made in step S1408 might be made by a device other than the originating gateway. For instance, the originating gateway might pass the cost information along to a gatekeeper or the routing controller, and the decision could be made by that device. This could occur if the cost information about what a customer is willing to pay is resident in one of these other devices.

The cost information about what a customer is willing to pay might be derived from many different sources. This information might be included in the call request originally placed by the customer. In other instances, this information might reside in a look up table that is stored in the originating gateway, or elsewhere on the network. The customer pricing information may also be time varying, with the customer willing to pay one rate for a call during business hours, and a different rate on off hours. Similarly, the customer pricing information might vary with the day of the week. Where the cost information is obtained from, how it is analyzed, and by what device, are all variables that could change from one embodiment to the next.

Figure 14:
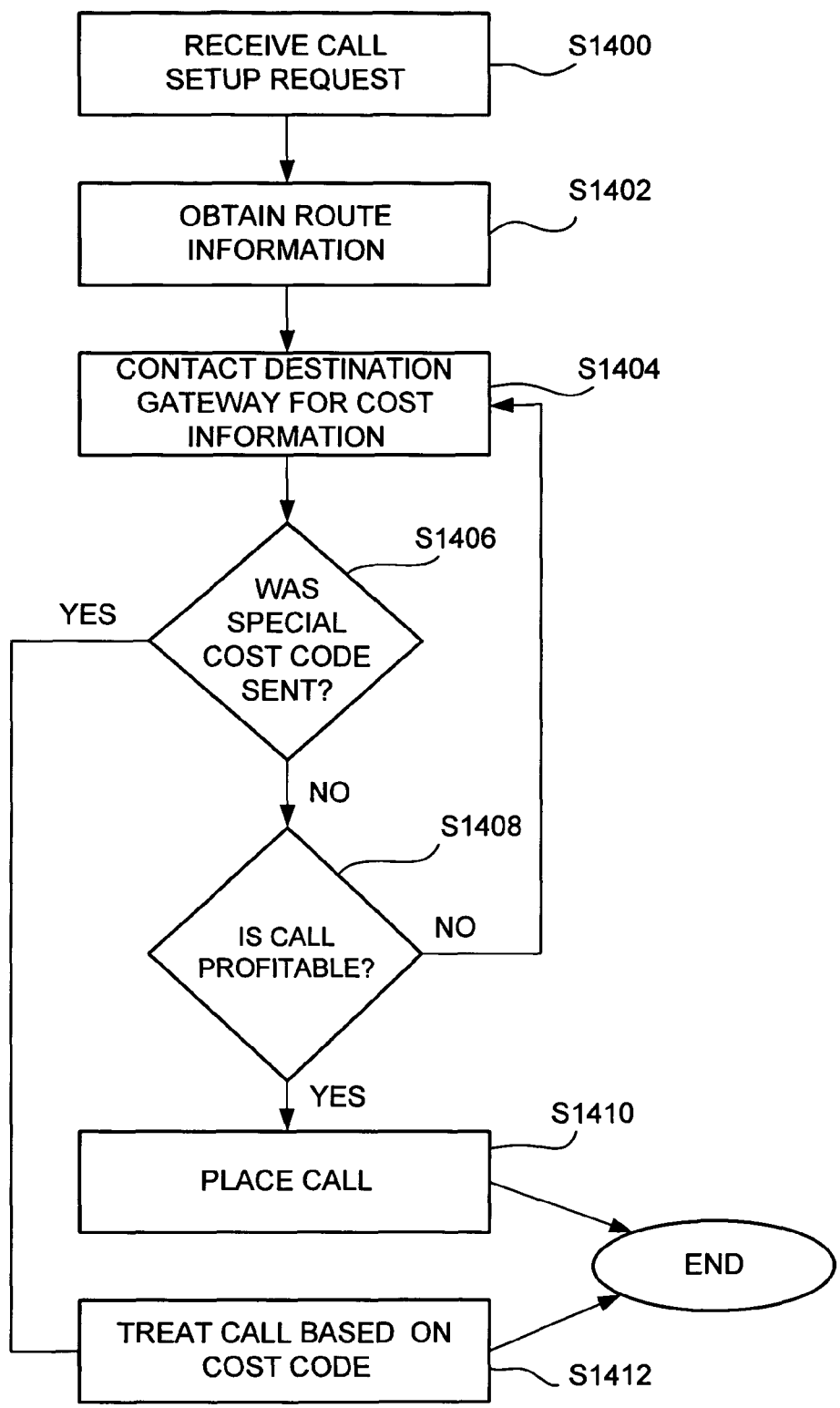
FIG. 14 is a schematic flow diagram of a method embodying the invention for treating a call in various different special manners.

In the method illustrated in FIG. 14, the decline destination gateway returns a special cost code to the originating gateway to instruct the originating gateway how to treat the call. However, in alternate embodiments of the invention, the decline destination gateway itself might treat the call in the desired manner without the need for the decline destination gateway to return a special cost code to the originating gateway.

In the embodiments described above, each of the decline destination gateways was used for its own specific call treatment purpose. This was the case in situations where the decline destination gateway itself accomplished the call treatment, and where the decline destination gateway returned a special cost code to the originating gateway to cause the originating gateway to accomplish the call treatment. In other embodiments of the invention, a single decline destination gateway could be used to accomplish multiple different call treatments.

In these new embodiments, the routing engine would instruct the originating gateway to encode call treatment information into the call setup request data that is sent to the destination gateway. For instance, the originating gateway could be instructed to insert special codes as prefixes to the DNIS information contained in a call setup request. The routing engine would also instruct the originating gateway to send the call setup request to a specific decline destination gateway, either immediately, or only after all valid potential destination gateways have been tried without success. In this embodiment, when the decline destination gateway receives a call setup request, it would examine the encoded information and use this information to determine how to treat the call.

As in the embodiments described above, the decline destination gateway could accomplish the desired call treatment itself, or it could return a special cost code to the originating gateway to instruct the originating gateway how to treat the call. In the latter case, the cost code returned to the originating gateway would be determined by the encoded information read by the decline destination gateway.

Figure 15:
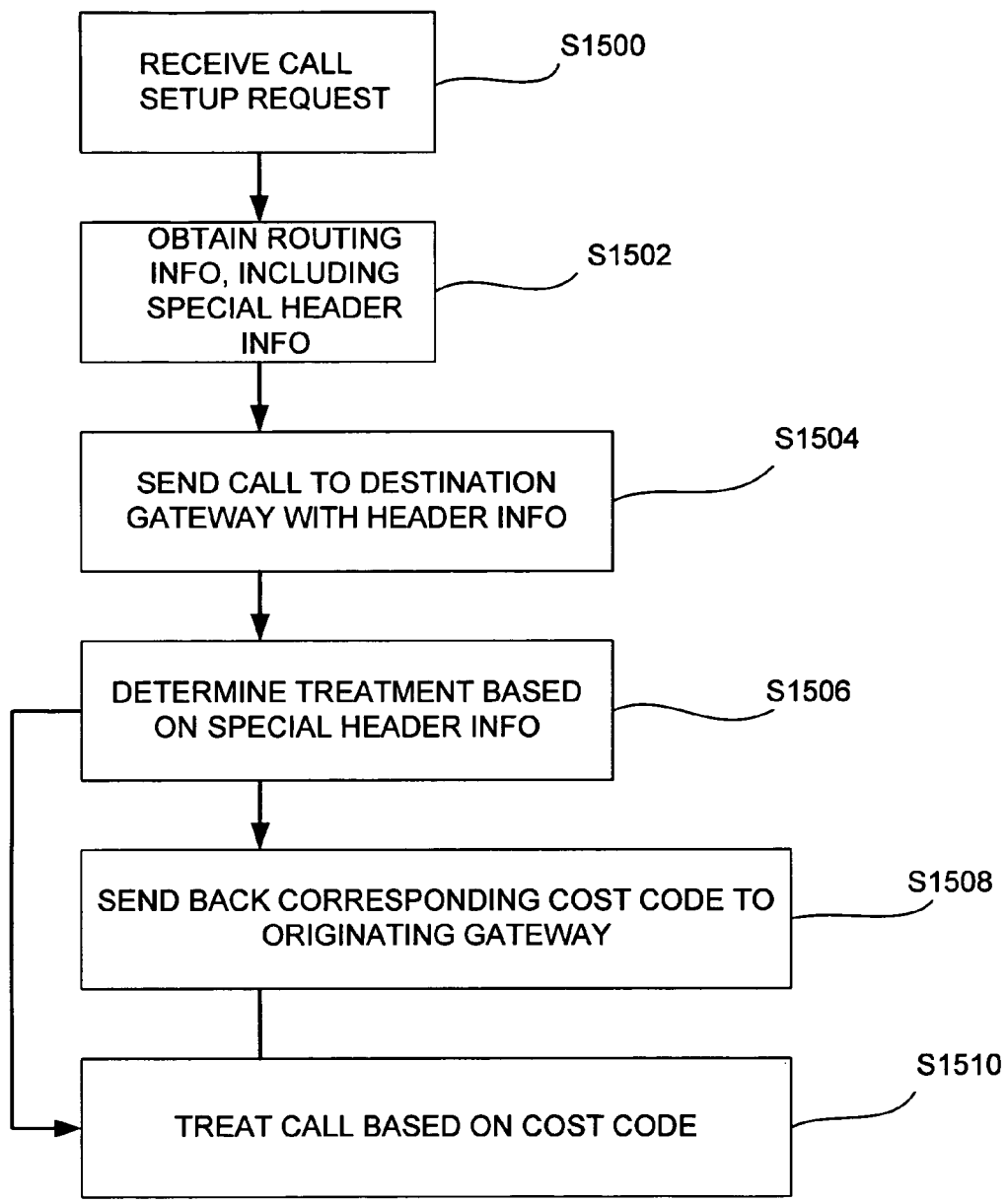
FIG. 15 is a schematic flow diagram of another method embodying the invention for treating a call in various different special manners.

A method embodying the invention and utilizing the special prefix codes is illustrated in FIG. 15. As shown therein, in step S1500, a call setup request is received by the system. In step 1502, the originating gateway would obtain routing information from the routing controller, and the routing information could include special prefix information that is to be placed in a header of a data field containing the DNIS of the called party. Of course, the encoded call treatment information could be placed in other places as well. The routing information would also, of course, include the addresses of one or more destination gateways.

In step S1504, the originating gateway would send the call to the first destination gateway specified by the routing controller. This could be an actual destination gateway capable of completing the call, or a decline destination gateway. In any event, if the call cannot be completed, the call will ultimately be sent to a decline destination gateway. Then, in step S1506, the decline destination gateway would examine the prefix information to determine how the call should be treated.

In some instances, in step S1508, the decline destination gateway would then return the special cost code corresponding to the desired call treatment to the originating gateway. Then, in step S1510, the originating gateway would treat the call based on the returned cost code. In alternate embodiments of the invention, the method would skip straight to step S1510, where the decline destination gateway itself would treat the call based on the decoded prefix information.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of determining when to decline a call request from a customer, wherein the call is to be routed from an originating gateway to one of a plurality of destination gateways over the Internet, comprising:
    obtaining call routing information that indicates destination gateways that are potentially capable of completing the call, wherein the routing information includes the address for a decline destination gateway that will cause the call to be treated in a special fashion, wherein the special fashion does not include attempting to complete the call to a destination telephony device identified in the customer's call request; and
    attempting to setup the call through at least one the destination gateway that is potentially capable of completing the call;
    sending a call setup request from the originating gateway to the decline destination gateway when the originating gateway determines that the call cannot be setup with any destination gateways potentially capable of completing the call;
    receiving a special code that is sent from the decline destination gateway to the originating gateway in response to the call setup request; and sending a call decline message from the originating gateway to the customer in response to receipt of the special code.

2. The method of claim 1, wherein the step of obtaining routing information includes obtaining a list of destination gateways, and wherein the decline destination gateway is the last destination gateway on the list.

3. The method of claim 1, wherein the attempting step comprises:
    sending a call setup request from the originating gateway to a destination gateway;
    receiving cost information from the destination gateway back at the originating gateway;
    determining if it would be profitable to place the call through the destination gateway; and
    repeating the sending, receiving and determining steps for an additional destination gateway if the result of the determining step for the first destination gateway indicates that it would not be profitable to place the call through the first destination gateway.

4. The method of claim 3, wherein the determining step comprises comparing a cost of completing the call through the destination gateway which is based on the received cost information to the price offered by the customer for carrying the call to determine if it would be profitable to complete the call through the destination gateway.

5. The method of claim 1, wherein the attempting step comprises:
    trying to setup the call through a destination gateway identified in the obtaining step;
    repeating the trying step, if necessary, until the call is setup through a destination gateway, or until all potential destination gateways identified in the obtaining step have been tried.

6. The method of claim 5, wherein the trying step comprises:
    sending a call setup request from the originating gateway to a destination gateway;
    receiving cost information from the destination gateway back at the originating gateway;
    determining if it would be profitable to place the call through the destination gateway.

7. The method of claim 6, wherein the determining step comprises comparing the cost of completing the call through the destination gateway to a price offered by the customer for carrying the call to determine if it would be profitable to complete the call through the destination gateway.

8. The method of claim 6, wherein the trying step further comprises:
    deciding to place the call through the destination gateway if the result of the determining step indicates that it would be profitable to place the call through the destination gateway; and
    deciding to try to place the call through an alternate destination gateway if the result of the determining step indicates that it would not be profitable to place the call through the destination gateway.

9. A system for determining when to decline a call request from a customer, wherein the call is to be routed from an originating gateway to a destination gateway over the Internet, comprising:
   means for obtaining call routing information that indicates destination gateways that are potential capable of completing the call, wherein the routing information includes the address for a decline destination gateway that will cause the call to be treated in a special fashion, wherein the special fashion does not include attempting to complete the call to a destination telephony device identified in the customer's call request;
   means for attempting to setup the call through at least one destination gateway that is potentially capable of completing the call;
   means for sending a call setup request from the originating gateway to a decline destination gateway when the originating gateway determines that the call cannot be setup with any of the destination gateways capable of completing the call;
   means for receiving a special code sent from the decline destination gateway to the originating gateway in response to the call setup request; and means for sending a call decline message from the originating gateway to the customer in response to receipt of the special code.

10. The system of claim 9, wherein the obtaining means comprises means for obtaining a list of destination gateways, and wherein the decline destination gateway is the last destination gateway on the list.

11. The system of claim 9, wherein the attempting means comprises:
   means for sending a call setup request from the originating gateway to a destination gateway;
   means for receiving cost information from the destination gateway back at the originating gateway; and
   means for determining if it would be profitable to place the call through a destination gateway, wherein the means for sending a call setup request is configured to contact additional destination gateways if the determining means determines that it would not be profitable to place the call through the first destination gateway.

12. The system of claim 11, wherein the determining means is configured to compare the cost of completing the call through a destination gateway to a price offered by the customer for carrying the call to determine if it would be profitable to complete the call through a destination gateway.

13. The system of claim 9, wherein the attempting means attempts to setup the call through a destination gateways identified by the obtaining means, until the call is setup through a destination gateway, or until all potential destination gateways have been tried.

14. The system of claim 13, wherein the attempting means comprises:
   means for sending a call setup request from the originating gateway to a destination gateway;
   means for receiving cost information from the destination gateway back at the originating gateway; and
   means for determining if it would be profitable to place the call through the destination gateway.

15. The system of claim 14, wherein the determining means is configured to compare the cost of completing the call through a destination gateway to a price offered by the customer for carrying the call to determine if it would be profitable to complete the call through the destination gateway.

16. The system of claim 14, wherein the attempting means further comprises:
   means for deciding to place the call through a destination gateway if the determining means determines that it would be profitable to place the call through the destination gateway; and
   means for deciding to try to place the call through an alternate destination gateway if the determining means determines that it would not be profitable to place the call through the destination gateway.

17. A system for placing telephone calls over the Internet between an originating gateway and a destination gateway in response to a call setup request from a customer, comprising:
   a routing controller configured to identify destination gateways capable of completing a call to a called party and a decline destination gateway that will cause the call to be treated in a special fashion, wherein the special fashion does not include attempting to compete the call to a destination telephony device identified in a customer's call request; and
   an originating gateway configured to attempt to place a call through at least one of a plurality of destination gateways identified by the routing controller, wherein the originating gateway is configured to send a call setup request to the decline destination gateway if the originating gateway determines that the call cannot be setup through any of the destination gateways identified for the call by the routing controller, and wherein the originating gateway is configured to send a decline call message to the customer when it receives a special code from the decline destination gateway.

18. The system of claim 17, wherein the routing controller is configured to provide the originating gateway with a list of destination gateways, wherein the list of destination gateways first lists destination gateways that are potentially capable of completing a call to a called party, and then lists at the decline destination gateway.

19. The system of claim 18, wherein the originating gateway is configured to first attempt to setup a call through one of the destination gateways that is potentially capable of completing the call to the called party, and wherein the originating gateway is configured to then try to setup the call through the the decline destination gateway.

20. The system of claim 18, wherein the originating gateway is configured to complete the call through one of the destination gateways capable of completing the call to the called party if the call can be carried for a profit, and wherein the originating gateway is configured to try to complete the call through the decline destination gateway if the call cannot be completed through one of the destination gateways for a profit.

21. The system of claim 17, further comprising at least one decline destination gateway which is configured to send the originating gateway a special code when the originating gateway attempts to setup a call with the at least one decline destination gateway.

22. A method of treating a call request from a customer in a special fashion, wherein the call is originally intended to be routed from an originating gateway to a destination gateway over the Internet, comprising:
   receiving a call request from a customer at an originating gateway; obtaining routing information for the call from a routing controller, wherein the routing information includes the address for at least one destination gateway that is potentially capable of completing the call and a decline destination gateway that will cause the call to be treated in a special fashion, wherein the special fashion does not include attempting to complete the call to a destination telephony device identified in the customer's call request;

attempting to setup the call through the at least one destination gateway that is potentially capable of completing the call;

sending a call setup request from the originating gateway to the decline destination gateway if the call cannot be competed through a destination gateway such that the call will be treated in the special fashion;

receiving a special code sent from the decline destination gateway in response to the call setup request back at the originating gateway; and treating the call in the special fashion.

23. The method of claim 22, further comprising the step of treating the call in the special fashion with the decline destination gateway.

24. The method of claim 23, wherein the treating step comprises answering the call with the decline destination gateway and playing a message to the calling party.

25. The method of claim 23, wherein the treating step comprises forwarding the call to a number other than the number called by the calling party.

26. The method of claim 22, wherein treating the call in the special fashion comprises treating the call in the special fashion with the originating gateway based on the reception of the special code.

27. The method of claim 26, wherein the treating step comprises playing a message to the calling party.

28. The method of claim 26, wherein the treating step comprises routing the call to a telephone number other than the number called by the calling party.

29. The method of claim 26, wherein the treating step comprises determining how to treat the call based on the special code received from the decline destination gateway.

30. The method of claim 26, further comprising:
selecting a special code with the decline destination gateway; and
sending the selected special code from the decline destination gateway to the originating gateway.

31. The method of claim 30, wherein the selecting step comprises:
reading call treatment information encoded into the call setup request sent from the originating gateway; and
selecting the special code based on the read call treatment information.

32. The method of claim 22, wherein the obtaining step comprises:
selecting one of a plurality of decline destination gateways, each of which is capable of causing a call to be treated in a different manner, based on a desired call treatment; and
providing the address of the selected decline destination gateway to the originating gateway.

33. A system capable of treating a call request from a customer in a special fashion, wherein the call is originally intended to be routed from an originating gateway to a destination gateway over the Internet, comprising:
means for receiving a call request from a customer at an originating gateway;
means for obtaining routing information for the call from a routing controller, wherein the routing information includes the address of at least one destination gateway that is potentially capable of completing the call and an address for a decline destination gateway that will cause the call to be treated in a special fashion, and wherein treating the call in a special fashion does not include attempting to complete the call to a destination telephony device specified in the customer call request;
means for sending a call setup request from the originating gateway to the at least one decline destination gateway that is potentially capable of completing the call;
means for sending a call setup request to the decline destination gateway if the call cannot be completed through a destination gateway that is potentially capable of completing the call, wherein sending the call setup request to the decline destination gateway will cause the call to be treated in the special fashion;
means for receiving a special code sent from the decline destination gateway in response to the call setup request back at the originating gateway; and
means for treating the call in the special fashion.

34. A system capable of treating a call request from a customer in a special fashion, wherein the call is originally intended to be routed from an originating gateway to a destination gateway over the Internet, comprising:
an originating gateway configured to receive a call request from a customer; a routing controller configured to provide routing information for the call to the originating gateway, wherein the routing information includes the address of at least one destination gateway that is potentially capable of completing the call and an address for a decline destination gateway that will cause the call to be treated in a special fashion, wherein the special fashion does not include attempting to complete the call to a destination telephony device specified in the customer call request, wherein the originating gateway is configured to first attempt to setup the request call through the at least one destination gateway that is potentially capable of completing the call, wherein the originating gateway is also configured to send a call setup request to the decline destination gateway if the originating gateway determines that the call cannot be setup through any of the destination gateways that are potentially capable of completing the call, wherein the originating gateway receives a special code back from the decline destination gateway in response to the call setup request sent to the decline destination gateway, and wherein the call is treated in the special fashion by at least one of the originating gateway and the decline destination gateway as a result to the call setup request being sent from the originating gateway to the decline destination gateway.

35. The system of claim 34, wherein the originating gateway is configured to treat the call in a special fashion in response to receipt of the special code.

36. The system of claim 35, wherein the originating gateway is configured to treat the call in multiple different special fashions depending on the type of special code it receives from the decline destination gateway.

37. The system of claim 34, further comprising at least one decline destination gateway that is configured to send at least one special code to the originating gateway to cause the originating gateway to treat the call in the special fashion.

38. The system of claim 37, wherein the at least one decline destination gateway comprises a plurality of decline destination gateways, and wherein each decline destination gateway is configured to send a different respective code to the originating gateway, in response to a call setup request, to cause the originating gateway to treat the call in a specific special fashion.

39. The system of claim 38, wherein the originating gateway is configured to treat the call in different special ways, depending on the special code it receives from a decline destination gateway to which it has sent a call setup request.

40. The system of claim 37, wherein the at least one decline destination gateway is configured to send one of a plurality of different special codes to the originating gateway.

41. The system of claim 40, wherein the at least one decline destination gateway is configured to read call treatment information encoded in a call setup request sent from the originating gateway, and wherein the at least one decline destination gateway is configured to send one of the plurality of different special codes to the originating gateway based on the call treatment information read from the call setup request.

42. The system of claim 41, wherein the originating gateway is configured to treat the call in different special ways, depending on the special code it receives from a decline destination gateway to which it has sent a call setup request.

43. The system of claim 34, further comprising at least one decline destination gateway that is configured to treat the call in the special fashion.

44. The system of claim 34, further comprising at least one decline destination gateway that is configured to read call treatment information encoded in the call setup request sent from the originating gateway, and wherein the at least one decline destination gateway is configured to treat the call in the desired special fashion based on the call treatment information read from the call setup request.

45. The system of claim 43, wherein the at least one decline destination gateway comprises a plurality of decline destination gateways, each of which is configured to treat a call in a different special fashion.

46. The system of claim 33, wherein the means for treating the call in a special fashion comprises means for declining the call request from the customer, wherein when the originating gateway receives a special code from the decline destination gateway in response to the call setup request, the means for declining the call request immediately declines the call request from the customer.

47. The system of claim 33, wherein the means for treating the call in a special fashion comprises means for playing a message to a caller, wherein when the originating gateway receives a special code back from the decline destination gateway in response to the call setup request, the means for playing a message to the caller plays a message to the caller who sent the call request.

48. The system of claim 33, wherein the means for treating the call in a special fashion comprises means for connecting a call to a telephone number, wherein when the originating gateway receives a special code back from the decline destination gateway in response to the call setup request, the means for connecting a call to a telephone number connects the caller to a telephone number other than the telephone number dialed by the caller.

49. The system of claim 33, wherein when the means for sending the call setup request to the decline destination gateway causes the call setup request to be sent from the originating gateway to the decline destination gateway, the decline destination gateway plays a message to the caller indicating that the call cannot be connected.

50. The system of claim 35, wherein when the originating gateway receives a special code from the decline destination gateway, the originating gateway immediately declines the call request.

51. The system of claim 25, wherein when the originating gateway receives a special code from the decline destination gateway, the originating gateway plays a message to the caller indicating that the call cannot be completed.

52. The system of claim 35, wherein when the originating gateway receives a special code from the decline destination gateway, the originating gateway causes the call to be connected to a telephone number other than a telephone number specified in the call request received from the customer.

53. The system of claim 43, wherein when the decline destination gateway receives a call setup request from the originating gateway, the decline destination gateway plays a message to the caller indicating that the call cannot be completed.

* * * * *